United States Patent [19]

Sparks et al.

[11] Patent Number: 4,885,139

[45] Date of Patent: Dec. 5, 1989

[54] COMBINED ELECTROSTATIC PRECIPITATOR AND ACIDIC GAS REMOVAL SYSTEM

[75] Inventors: Leslie E. Sparks, Durham; Norman Plaks, Raleigh, both of N.C.

[73] Assignee: The United States of America as represented by the Administrator of U.S. Environmental Protection Agency, Washington, D.C.

[21] Appl. No.: 47,577

[22] Filed: May 8, 1987

Related U.S. Application Data

[63] Continuation-in-part of Ser. No. 768,265, Aug. 22, 1985, abandoned.

[51] Int. Cl.$^4$ ............................. B03C 3/04; B03C 3/40
[52] U.S. Cl. ............................................ 422/169; 55/2; 55/10; 55/122; 55/131; 55/138
[58] Field of Search ........................ 55/2, 10, 122, 131, 55/126, 138; 422/169

[56] References Cited

U.S. PATENT DOCUMENTS

| | | |
|---|---|---|
| Re. 30,479 | 1/1981 | Cohen et al. . |
| 3,149,936 | 9/1964 | Rich . |
| 3,958,960 | 5/1976 | Bakke ................................... 55/122 |
| 4,208,383 | 6/1980 | Kisters et al. ........................ 422/169 |
| 4,233,037 | 11/1980 | Pontius et al. . |
| 4,244,709 | 1/1981 | Chang .................................. 55/138 |
| 4,266,948 | 5/1981 | Teague et al. ........................ 55/131 |
| 4,305,909 | 12/1981 | Willet et al. ......................... 422/169 |
| 4,349,359 | 9/1982 | Fitch et al. . |
| 4,431,434 | 2/1984 | Rinard et al. . |
| 4,530,822 | 7/1985 | Ashley et al. ....................... 422/169 |
| 4,600,568 | 7/1986 | Yoon et al. . |
| 4,600,569 | 7/1986 | Yoon . |

OTHER PUBLICATIONS

"Modeling of $SO_2$ Removal in Spray-Dryer Flue-Gas Desulfurization System, by Ashok S. Damle, et al, Fifth Particulate Symposium," presented 8/84, published 2/86.

"Investigation of Combined Particulate and $SO_2$ Using E-Sox", by Leslie E. Sparks et al, Ninth Symposium on Flue Gas Desulfurization, Presented Jun. 4–7, 1985, Publ. 12/85.

"Removal of Sulfur Dioxide and Particulate using E-Sox", Sparks et al, Fifth Particulate Symposium, Presented 8/84, Published 2/86.

Kirk-Othmer *Encyclopedia of Chemical Technology*, 3rd edition vol. 1, pp. 673–687, 1978.

Primary Examiner—Michael S. Marcus
Attorney, Agent, or Firm—Browdy and Neimark

[57] ABSTRACT

The cost-effectiveness of sulfur oxides and particulate matter removal is improved by placing a sulfur oxides or other acidic gases removal system and a multi-stage electrostatic precipitator within a single housing. The sulfur oxides or other acidic gas removal system works by spraying a neutralizing slurry or solution into incoming flue gas to form neutral salts which dry in a reaction zone provided between the sulfur oxides or other acidic gas removal system and the electrostatic filtration module. This system also provides for simple retrofitting of existing systems to include $SO_2$ or other acidic gas removal systems.

4 Claims, 14 Drawing Sheets

COMBINED ELECTROSTATIC PRECIPITATOR AND ACIDIC GAS REMOVAL SYSTEM

This application is a continuation-in-part of application Ser. No. 768,265, filed Aug. 22, 1985, abandoned.

BACKGROUND OF THE INVENTION

The invention relates generally to air pollution control technology and more specifically to the removal of particulate matter and sulfur oxides ($SO_x$, $SO_2$) or other acidic gases, such as HCl, from contaminated gases. The following description of the invention refers primarily to removal of $SO_x$ and particulates, since most of the experimental work by the inventors involved removal of oxides of sulfur and particulates from contaminated gases. However, because of the nature of the invention it can be utilized to remove acidic gases other than $SO_x$. Thus, the reference to $SO_x$ and $SO_2$ removal in this application is intended to include the removal of other acidic gases and particulates from a gas stream, and should not be construed as limiting the invention to the removal of only $SO_x$ and particulates.

In recent years, electric power generating plants and industrial boilers have been increasingly relying on high sulfur coals as a relative inexpensive fuel. This in turn results in the generation of excessive amounts of $SO_x$. As a result, the seriousness of the "acid rain" problem has been increasing.

Additionally, coal burning creates a large amount of particulate matter. This particulate matter often remains suspended in the air for a long period of time, thus creating a serious health problem. Since these particulate materials often are, or quickly become, charged, they tend to settle on oppositely charged surfaces. Thus, the particulates cause unsightly blemishes on building, trees, curtains, etc. Additionally, these particulates can settle on machinery and electronic equipment, causing equipment malfunctions and increased wear and tear, resulting in economic loss.

Thus, there have been several efforts to remove $SO_x$ and to remove particulate matter from contaminated air. For example, in a process described by Kisters et al, in U.S. Pat. No. 4,229,411 (hereinafter referred to as Kisters et al), an aqueous solution of a neutralizing agent, such as sodium hydroxide or milk of lime is sprayed into sulfur oxides containing air. Initially, the neutralizing agents react with sulfur oxides, yielding wet salts. As the drops of water evaporate, the air is cooled and dry salts are formed. The dry salts are then removed from the gas by an electrofilter.

In both Rich (U.S. Pat. No. 4,349,359) and Fitch et al, small air borne particles are removed by charging the particles in a precharger and then subjecting the particles to an electrostatic precipitator.

Heretofore, there have been no attempts to combine $SO_x$ control and particulate control technology in a single unit. A major reason why such a combination of technologies has not been attempted has been that each of these technologies has obtained a separate status in the art. Also, it has been thought that to combine $SO_x$ and particulate control in a single apparatus or method, it was necessary to provide the spray and the precipitator systems separately, thereby adding to the complexity, size and cost of the necessary apparatus. For example, most neutralizing spray systems have been incorporated in the ductwork leading to the electrostatic precipitator (hereafter referred to at times as ESP).

SUMMARY OF THE INVENTION

It is an object of the present invention to provide a simple and economic means of removing both sulfur oxides or other acidic gases and particulate pollutants.

It is another object of the present invention to combine the removal of sulfur oxides and particulate pollutants in a single unit.

It is a further object of the present invention to provide a method and apparatus for removing both sulfur oxides and particulate matter from air which requires a relatively small amount of space in comparison to the prior art.

These and other objects are achieved in the present invention. Water containing an alkali material, such as sodium bicarbonate, sodium carbonate, lime or limestone, is injected at multiple injection sites into a gas stream containing sulfur oxides. The alkali materials react in solution with the sulfur oxides to neutral salts in a water solution. These salts then precipitate from the solution when the water droplets dry. The particles are then passed through a multi-stage electrostatic precipitator which charges and removes them along with other particulate pollutants.

Combined removal of sulfur oxides and particulate matter (hereinafter referred to at times as "E-$SO_X$") combines particulate and $SO_x$ (typically $SO_2$) collection in a single physical package. The first portion of the package consists of a liquid injection system through which alkali solution or slurry is injected. The injection system atomizes the liquid into small drops. $SO_2$ is removed by the drops and by the residual solids left behind after the drops evaporate. The second portion of the system consists of a multi-stage electrostatic precipitator which collects the fly ash and the residual solids. The theory behind each of the two portions of the invention is discussed below.

$SO_x$ control in E-SOX can be described by classical chemical engineering theory for heat and mass transfer to drops and solids. $SO_x$ control in E-SOX can be divided into three stages. The first stage consists of mass transfer of the $SO_x$ to the injected alkali drops. The second phase consists of mass transfer of $SO_x$ to the wet alkali particles which exist after the drops are evaporated. The final phase consists of mass of $SO_x$ transfer to the dry particles. The $SO_x$ control in the first two phases occurs at the same time that water is being evaporated—first from the drop and then from the wet particle. A description of the process can be developed from classical chemical engineering and is described in the report entitled "Modeling of $SO_2$ Removal in a Spray -Dryer Flue-Gas Desulfurizer" by Ashok S. Damle and Leslie E. Sparks presented at the 5th Symposium on the Transfer and Utilization of Particulate Control Technology at Kansas City, Mo. Aug. 27–30, 1984, incorporated This article reads as follows:

INTRODUCTION

Spray drying technology for $SO_2$ absorption/removal from flue gases has been advanced for the past few years. In spite of a large amount of pilot-plant testing and a few full-scale commercial applications, however, there is still a lack of comprehensive predictive modeling of this process. A review of qualitative mechanisms so far proposed was published recently (1, 2). Semi-empirical relationships have been developed to relate $SO_2$ removal efficiency of the spray dryer system with stoichiometric ratio and approach to saturation (3, 4). Such relationships, due to the empirical parameters, tend to be specific for the spray dryer system used to obtain them.

This paper presents a simple mathematical model describing various processes occurring in a spray-dryer flue-gas desulfurization (FGD) system. The overall process is subdivided into subprocesses contributing to $SO_2$ removal. Various parameters required for such a mode are identified. An overall qualitative picture is described first in this paper, followed by modeling of the different subprocesses.

OVERALL PROCESS

In a spray dryer $SO_2$ removal system, a conventional spray dryer is typically used to contact $SO_2$-laden flue gas with spray droplets of a slurry or a solution of a suitable sorbent. A typical schematic of a spray dryer system is shown in FIG. [7]. Rotary or pneumatic atomizers are used to inject the sorbent slurry/solution. Amount of sorbent added depends upon stoichiometric ratio to be used and the inlet flue gas $SO_2$ concentration. Amount of water added into the system is controlled by inlet flue gas temperature and humidity, and the desired approach to saturation at the spray dryer outlet. Lime slurry is typically prepared in a slaker to obtain a slurry of fine-grained lime particles. Although lime is predominantly used as a sorbent, some studies have also been conducted with sodium carbonate and bicarbonate which are highly soluble and are therefore injected in a solution form. Flue gas is usually introduced at the top of spray dryer cocurrently with the sorbent, but other configurations are also possible. The flue-gas residence time is typically about 10 seconds. After the spray dryer, the flue gases, among with flyash and dried sorbent/product particles, pass through particulate control equipment, such as a baghouse or an electrostatic precipitator. Some particulate collection may also occur in the spray dryer itself.

In the spray chamber, two processes occur simultaneously: water evaporates from the droplet: and $SO_2$ is absorbed in, and reacts with, the alkaline sorbent. The flue gas is typically humidified adiabatically to within 20° to 60° F.* of its saturation temperature. The sorbent in the spray droplets, along with the reaction products, is evaporated to apparent dryness up to a certain equilibrium moisture content and entrained in the flue gas. The resulting solid particles are removed in a particulate collection device. The amount of water evaporated from a droplet is determined by the operating conditions of the dryer-inlet gas temperature, inlet gas relative humidity, approach to saturation temperature, and corresponding equilibrium moisture content of the solid. $SO_2$ may be removed by the sorbent both during and after drying of the droplets. It is commonly believed that most of the $SO_2$ removed before the slurry droplets are dried. Spray dryer operation nearer to flue-gas saturation condition and higher stoichiometric ratios improve $SO_2$ removal efficiencies. $SO_2$ removal may continue through the particulate collection equipment as a gas passes through filter cake in the baghouse or over the deposits on the collection plates in case of an electrostatic precipitator. A portion of the waste particulate discharge from the spray dryer and the particulate collection device may be recycled into the spray dryer's feed slurry to increase the sorbent utilization.

*Use the equation °C.=5/9 (°F.−32) to convert to the equivalent metric unit.

Although droplet evaporation and $SO_2$ absorption occur simultaneously, the droplet drying process is more or less independent of the $SO_2$ absorption process. On the other hand, the $SO_2$ absorption/reaction process has been observed to be strongly related to the drying process and droplet moisture content. Thus, the drying process may be considered first to estimate the drying time of a droplet, rate of drying, and the droplet moisture content with time. The $SO_2$ absorption is then considered to determine the rate of absorption/reaction and the $SO_2$ removal during the droplet drying process. $SO_2$ absorption/reaction occurs both before and after drying of the droplets in the spray chamber and continuous through the particulate collection device until the dried droplet is deposited.

DRYING OF DROPLETS

When sorbent is introduced in the slurry form, the slurry feed to the spray absorber is usually 60–95 percent moisture and contains finely divided solid, sorbent particles suspended in liquid medium. The drying behavior of a slurry droplet with freely moving sorbent particles is similar to that of solution droplet. In line with conventional drying theory (5), the evaporation from a slurry/solution droplet may be expected to proceed in two stages. In the first stage, the solid's concentration does not affect evaporation rate, and this stage continues until the moisture level falls below a critical moisture content. During this stage, similar to the conventional constant drying-rate stage, the rate of evaporation is solely determined by the resistance of the gas film surrounding the droplet to the transfer of water vapor. In case of a solution droplet, the solid phase appears during this stage as the amount of water remaining in the droplet is reduced. In the second stage, the solid's concentration reduces the rate of drying, since the moisture must diffuse through the solid matrix. During this stage, there is a change from water as a continuous phase, initially in the droplet, to the solid matrix as a continuous phase; the solid individual particles touch each other and are no longer mobile in the droplet. The drying continues until the droplet moisture content reaches an equilibrium with the surrounding gas atmosphere. The drying behavior of droplets in a spray chamber has been studied extensively, at least for the first stage (6, 7, 8, 9, 10). The drying process in the two stages are considered in the following section.

CONSTANT RATE OF DRYING PERIOD

The rate of droplet drying in this period is determined by the simultaneous heat transfer from gas phase to the droplet, and mass transfer from the droplet to the gas phase. The heat and mass transfer processes between droplet and surrounding gas phase have been studied extensively (11, 12). The respective transfer coefficients may be determined by the widely used empirical correlations by Ranz and Marshall (12):

$$Sh = 2 + \alpha Re^\beta Sc^\gamma,$$

$$Nu = 2 + \alpha Re^\beta Pr^\gamma, \quad (1)$$

where $Sh$=Sherwood Number for mass transfer $(k_d d_d / D)$; $Nu$=Nusselt Number for heat transfer $(d/k)$; $Re$=Reynolds Number based on droplet diameter an relative velocity between droplet and air $(d_d v \rho / \mu)$; $Sc$=Schmidt Number $(\mu / \rho D)$; $Pr$=Prandtl Number $(C_p \mu / k)$; $k_d$=gas-phase mass-transfer coefficient;

$d_d$ = droplet diameter; D = gas-phase diffusivity; h = convective heat-transfer coefficient; k = gas-phase thermal conductivity; v = relative velocity between droplet and gas phase; $\rho$ = gas-phase density; $\mu$ = gas-phase viscosity; and $C_p$ = gas-phase specific heat. The best fit values for constants $\alpha$, $\beta$, and $\gamma$, as given by Ranz and Marshall (12), are 0.6, 0.5, and 0.33, respectively.

To use the above correlations, the relative velocity between air and a droplet, v, is required. The movement of droplets in a spray chamber is highly complicated, but may be broken down into two stages: (1) deceleration, and (2) free fall, with respect to air. Droplets often have very high initial velocity leaving the atomizer and are first decelerated due to the resistance of the surrounding air to a steady-state free-fall velocity. In the second stage the droplet may be considered to move at the free-fall velocity. The deceleration time depends upon the droplet diameter and is usually very short. For example, a 100-$\mu$m droplet may be decelerated from 67 m/sec to 5 m/sec within 0.0185 second (6), and for smaller droplets less time would be required. Since this period is usually of short duration (less than 0.1 second), its contribution to drying of the droplet and $SO_2$ removal may be ignored. The free-fall velocity of the droplets in the air may be approximately determined by the Stokes' Law as:

$$v = \frac{(\rho_1 - \rho) g\, d_d^2}{18\,\mu}, \tag{2}$$

where $\rho_1$=density of droplet and g=acceleration due to gravity. Ideally, a three-dimensional momentum balance equation should be considered for the droplet and gas phase to determine droplet trajectories and relative velocities in the spray chamber. However, only one-dimensional gas phase and droplet flow is considered here for model simplicity.

If the effect of relative velocity is ignored (v=0), Equation (1) simplifies to:

$$\text{Sh, Nu} \approx 2. \tag{3}$$

For droplet temperature $T_d$, bulk gas temperature $T_g$, bulk water vapor mole fraction $x_{g,w}$, and equilibrium vapor-mole fraction at droplet surface $x_{d,w}$ (see FIG. 8*a*), the respective rates of mass ($N_w$) and heat transfer (Q are given by:

$$N_w = k_d \pi d_d^2 c (x_{d,w} - x_{g,w}), \tag{4}$$

and $$Q = h \pi d_d^2 (T_g - T_d), \tag{5}$$

where c=mean molar density of the gas phase, $N_w$=the molar rate of mass transfer (evaporation of water), Q=rate of heat transfer, and h=heat transfer coefficient.

The above equations, however, do not take into account the effect of water evaporation on the heat and mass transfer rates. For a quiescent droplet-gas system (v=0) (FIG. 8*b*), a rigorous analysis, taking into account the above effects, leads to the following expressions:

$$N_w = 2\pi D_{water\text{-}air}\, c\, d_d \ln\left[\frac{1 - x_{g,w}}{1 - x_{d,w}}\right], \tag{6}$$

-continued and $$Q = 2\pi k\, d_d (T_g - T_d)\left(\frac{\epsilon}{e^{\epsilon} - 1}\right), \tag{7}$$

where e=base for natural logarithm, and e=dimensionless heat-transfer rate factor and, for water, is given by:

$$\epsilon = \frac{9}{\pi}\ \frac{N_w C_p}{k\, d_d}, \tag{8}$$

where $C_p$=specific heat of water vapor.

Equations (6) and (7) take into account the effect of evaporation of water on the rates of heat and mass transfer, and they approach Equations (4) and (5) for low droplet Reynolds Number when Sh, Nu$\approx$2, and for low rates or water evaporation.

FALLING RATE OF DRYING PERIOD

The constant rate-drying process continues until the moisture content the droplet falls below a critical moisture content at which of the solid's concentration beings to influence the drying rate. Critical moisture content of the droplet is also a property peculiar to its solids properties such as hygroscopicity (13). The critical moisture content may be considered as the one at which the solid particles begin to touch each other and form a continuous phase. The drop diameter then does not change during further drying (14). This period continues until the moisture content reaches an equilibrium value.

In this period, drying is controlled by diffusion of moisture through the solid matrix. The drying rate may be assumed to fall linearly between the critical-moisture content and equilibrium-moisture content, and may be expressed by:

$$\text{Rate of Drying} = \left(\begin{array}{c}\text{Rate of drying based on}\\ \text{gas-phase resistance alone}\end{array}\right)\left(\frac{X - X_e}{X_c - X_e}\right), \tag{9}$$

where X=droplet moisture content at time t, wt. % dry basis; $X_e$=equilibrium-moisture content, wt. % dry basis; and $X_c$=critical-moisture content, wt. % dry basis. The rate of drying, based on gas-phase resistance alone, is determined using equations developed earlier in this paper. The parameters, critical-moisture content and equilibrium-moisture content, depend upon the solid's content and their properties and must be determined experimentally. The critical-moisture content for lime, clay, etc., is typically in the rang of 25–60 percent moisture. Solid's properties, such as hygroscopicity and deliquescent nature, and the relative humidity of surrounding gas determine the equilibrium-moisture content. For given solids, equilibrium-moisture content varies linearly with respect to relative humidity of the surrounding gas phase.

In a given spray-dryer system, the final moisture content at the spray-dryer exit may be expected to be close to the equilibrium-moisture content. The final moisture contents in droplets at the spray-dryer exit were reported by Felsvang (15) from a pilot-plant study and were found to depend upon the approach to saturation temperature and the droplet size. The fact that moisture content depends on droplet size indicates that the larger droplets did not reach an equilibrium state by the end of spray drying in this particular study. The measured moisture contents in this study ranged from 0.5 to 1.5 percent for "very fine" droplets and 0.5 to 3.0 percent for "fine" droplets. There seem to be a lot of variations in measured values of solid, moisture content at the stray-dryer outlet as reported in the literature. For example, Stevens et al. (16) reported measured values of moisture content which ranged from 5 to 20 percent, which is almost an order of magnitude higher than those of Felsvang's (15) work. Stevens et al. (16) also reported variations in moisture content with residence time and atomizer speed for the same approach to saturation, indicating that the droplets had not reached an equilibrium-moisture level.

Determination of equilibrium-moisture content is very important to estimate the drying time of the droplet in this second period. This is also critical for prediction of $SO_2$ removal, as the aqueous reactions may be assumed to continue until the droplet reached low enough moisture content. High equilibrium-moisture content may enhance continued $SO_2$ removal after the droplet is "dried" to its equilibrium moisture value.

The critical-moisture content divides the total drying time in the above-mentioned two stages and is thus important as different drying-rate relations apply in each stage. The drying time required for each stage may be determined using the apparatus drying-rate expression and the parameters, critical- and equilibrium-moisture content of solids.

$SO_2$ ABSORPTION/REACTION IN SPRAY DRYER

Absorption and reaction of $SO_2$ in a sorbent droplet occurs both before and after drying of the droplet up to an equilibrium-moisture content. Presence of moisture during wet-droplet stage plays an important role as it provides an aqueous medium for absorption and fast ionic reaction of $SO_2$. The lack of moisture in dry-particle stage considerably reduces the rate of $SO_2$ removal as absorption and reaction in solid phase is likely to be slower. This is especially true for the lime sorbent which has a low reactivity in solid phase. The mechanism of $SO_2$ removal in the two stages are distinctly different and, therefore, will be considered separately.

WET-PARTICLE STAGE

During the wet stage, moisture in the droplet participates actively in the overall $SO_2$ removal process. $SO_2$ is transported from the bulk-gas phase to the droplet surface by gas-phase diffusion process. The dissolved $SO_2$ migrates from the interface to the interior of the droplet by liquid-phase diffusion and reacts with the dissolved sorbent. If a sparingly soluble sorbent, such as lime, is used, dissolution of sorbent also becomes important. If the ionic reaction between sorbent and $SO_2$ is considered as very fast, both species may migrate to a reaction plane or zone in the bulk liquid as shown in FIG. [9]. The dissolution process will not be present in case of a highly soluble sorbent, but the overall process may still be represented by FIG. [9] by replacing the equilibrium-solubility sorbent concentration by the bulk liquid-phase sorbent concentration.

The above picture is easier to visualize for a wet droplet with a moisture content greater than the critical moisture content when the sorbent particles are freely moving. The above processes become less obvious during further drying as the water phase becomes discontinuous. Nevertheless, for model simplicity, the moisture held within particle interstices may still be assumed to provide enough aqueous medium for the $SO_2$ absorption process. $SO_2$ removal during the wet stage by the above mechanism may be assumed to continue till the moisture content in the droplet falls to a certain low level, the lower limit being the equilibrium moisture content. After that, the droplet may be considered as a dry-porous solid to determine further $SO_2$ removal. Specific steps that are involved in the removal of $SO_2$ during a wet-droplet stage may be described as follows:

1. Transfer of $SO_2$ from bulk-gas phase to droplet/particle surface. The rate of transfer in this step is controlled by the resistance of a gas film around the droplet.
2. Dissolution of $SO_2$ into the liquid phase in the droplet, and transfer of dissolved $SO_2$ from the droplet surface to interior liquid. The transfer rate is controlled by the liquid-film resistance in this step.
3. Dissolution of lime into this liquid phase.
4. Ionic reaction between dissolved $SO_2$ and dissolved lime in liquid phase.

Gas-Film Resistance

Diffusion of $SO_2$ from the bulk-gas phase to the droplet surface is similar to water evaporation from the droplet surface, and similar correlations apply.

The Sherwood Number for mass transfer is given by:

$$Sh=2+0.6Re^{0.5}Sc^{0.33}, \qquad (1')$$

and in a limiting case for small droplets and low Reynolds Number (as discussed earlier in this paper), $Sh \approx 2$. The rate of $SO_2$ transfer, $N_s$, from gas phase to droplet surface would then be given by:

$$N_s=k_d(\pi d_d^2)c(x_{g,s}-x_{d,s}). \qquad (10)$$

where $x_{g,s}$ and $x_{,s}$ are mole fractions of $SO_2$ in gas phase at the bulk gas and at the droplet surface, respectively. [see also Equation (4)].

The above formulation does not however, take into account the effect of water evaporation on $SO_2$ diffusion. This may be done in a rigorous analysis for a quiescent droplet-air system which gives the rate of $SO_2$ mass transfer under condition $N_w >> N_s$, as:

$$N_s = \frac{x_{g,s}N_w}{F-1} - \frac{N_w x_{d,s} F}{F-1}, \qquad (11)$$

where $F=exp(N_w/2\pi D_{SO_2\text{-}air} c^d{}_d)$.

The rate of $SO_2$ transfer from gas phase to droplet surface, as given by Equations (10) and (11), is strongly dependent on $SO_2$ concentration in the bulk-gas phase.

Liquid-Film Resistance

No good correlations are available to estimate the liquid-phase resistance in the droplet to the mass transfer. An order of magnitude estimate may be obtained. For a droplet diameter of 25–50 μm containing primary lime particles of the order of 1–5 μm, the liquid-film thickness, δ, at the surface contributing this resistance may be considered to be of the order of 1 μm. The liquid-phase mass transfer coefficient may then simply be obtained as the ratio of diffusivity of $SO_2$ in liquid and δ;

$$k_1 = \frac{D_{SO_2\text{-water}}}{\delta} \approx 0.17 \text{ cm/sec,} \quad (12)$$

Important consideration should be given to the enhancement of this liquid film mass-transfer coefficient due to the very fast reaction of dissolved $SO_2$ with dissolved lime in the bulk liquid. From the theory of mass transfer with chemical reaction in liquid phase (17), this enhancement may be expected to be on the order of $\phi$:

$$\phi = 1 + \frac{D_{\text{lime-water}} C^*_{\text{lime}}}{D_{SO_2\text{-water}} C^*_{SO_2}}, \quad (13)$$

where D=diffusivity, and C*=equilibrium solubility concentration.

Calculations using typical diffusivity and solubility values indicate that, due to this enhancement factor, $\phi$, the liquid-phase resistance to $SO_2$ mass transfer is two orders of magnitude smaller compared to gas-phase resistance (18). Therefore, the liquid-phase resistance may be ignored in model simulations without significant error.

Dissolution of Lime

This step is obviously required only for sorbents such as lime which are sparingly soluble in water. Rate of dissolution if lime may be approximately estimated using the diffusivity of lime in water, its solubility, and the average distance between lime particles in the droplet. Based on a simple film model (FIG. 3), the rate of lime dissolution from a single lime particle, $R_p$, is suspended in a lime slurry droplet is given by:

$$R_p = D_{\text{lime-water}} \# d_p^2 \left( \frac{C^*_1 - C_1}{\delta} \right), \quad (14)$$

where $d_p$=average primary lime particle diameter; $C_1^*$=equilibrium solubility concentration of lime in water; $C_1$=concentration of lime in bulk solution; and $\delta$=liquid film thickness responsible for lime dissolution and may be approximated to half of the interparticle distance between lime particles suspended in a droplet.

For particle diameter, $d_p$, and moisture-volume fraction, w, the film thickness, $\delta$, based on interparticle distance, may be given for a cubical particle arrangement as:

$$\delta = d_p \left( \frac{0.973}{(1-w)^{\frac{1}{3}}} - 1.0 \right). \quad (15)$$

For fast reaction between dissolved $SO_2$ and lime, both the species diffuse to a reaction front where $C_1 \approx 0$. The rate of lime dissolution from all lime particles in a droplet, $R_d$, assuming a discrete primary lime particle-size distribution with I size channels, is given by:

$$R_d = \sum_{i=1}^{I} R_{p,i} n_i, \quad (16)$$

where $R_{p,i}$=rate of lime dissolution from a single lime particle of size $d_{p,i}$, and $n_i$=number of lime particles of size $d_{p,i}$ in a droplet. The above equations are of course approximate, and better correlation should be developed by carrying out lime-dissolution experiments.

Liquid-Phase Reaction Rate

For a finite liquid-phase reaction rate for the reaction between dissolved $SO_2$ and sorbent, it may be necessary to consider its effect on overall removal of $SO_2$. Since the concentration of dissolved sorbent (e.g., lime) is usually in large excess to dissolved $SO_2$ concentration, the reaction rate may be expected to depend predominantly on liquid-phase $SO_2$ concentration. The rate of reaction in such a case may be expressed by:

$$\begin{aligned} N_s &= k_r \frac{\pi d_d^3}{6} w\, C_{SO_2,1} \\ &= k_r \frac{\pi d_d^3}{6} w \frac{c\, x_{d,s}}{H}, \end{aligned} \quad (17)$$

where $k_r$=volumetric reaction rate coefficient; w=volume fraction of liquid in droplet; $C_{SO_2,1}$=liquid-phase $SO_2$ concentration; c=molar density of gas phase; $x_{d,s}$=mole fraction of $SO_2$ in the gas phase at the droplet surface; and H=Henry's Law constant.

Equation (17) may be combined with Equation (10) to obtain a reduction factor, $\psi$, for the gas-phase mass transfer:

$$\psi = \frac{1}{1 + \frac{6H\, k_d}{d_d w\, k_r}} = \frac{\text{rate of mass transfer with finite liquid-phase reaction rate}}{\text{rate of mass transfer with gas-phase resistance alone}}. \quad (18)$$

For infinite liquid-phase reaction rate ($k_r \to \alpha$), of course $\psi = 1$.

In case of infinite liquid-phase reaction rate, the controlling mechanisms of $SO_2$ removal will be determined by relative values of $N_s$ and $R_d$ as given by Equations (11) and (16) for $SO_2$ gas-phase mass transfer and lime dissolution rate, respectively. If $N_s > R_d$, the overall $SO_2$ removal rate will be controlled by lime dissolution rate and by given by $R_d 2$. On the other hand if $N_s 21\, R_d$, the gas-phase mass-transfer resistance to $SO_2$ transfer will control its removal rate.

Effect of Product Precipitation

In developing above relations, the effect of product formation is ignored. The reaction products of lime (e.g., $CaSO_3$ and $CaSO_4$) have low solubility and would therefore precipitate within the droplet. As this precipitation may take place on existing lime particles, it may affect the lime dissolution rate. In deriving relationships for the rate of lime dissolution, it was assumed that all the particle surface area is available for dissolution. The reduction in lime dissolution rate would be directly proportional to surface area of a lime particle obstructed by product precipitation. In the early stages of drying, this effect would tend to be minimal because of the mobility of lime particles within a droplet and also due to the low level of product formation. This effect would increase significantly as the solid phase becomes the continuous phase, since the immobility would allow the precipitated product layer to build up on the lime particle surface. A simpler way to account for this effect in the model is to ignore it in the early stages until moisture content falls to the critical moisture content, and in later stages consider the dissolution rate to be proportional to the lime fraction remaining in the solid phase.

DRY-PARTICLE STAGE

As the droplet dries and moisture content approaches the equilibrium moisture level, diffusion of $SO_2$ into the solid matrix becomes important. Primary sorbent particles form a continuous solid-phase matrix and become immobile, and the $SO_2$ removal process thus becomes that of $SO_2$ diffusion through solid matrix with chemical reaction. Analysis of $SO_2$ absorption during this dry-particle stage may be carried out in a rigorous approach of diffusion of $SO_2$ into a spherical solid matrix with chemical reaction. For this approach, both the diffusivity of $SO_2$, in the solid matrix and the reaction coefficient are needed. The local reaction rate depends upon the local $SO_2$ concentration, reaction-rate coefficient, and local mass fraction of lime in the solid. Such rigorous analysis may be simplified for cases in which either the diffusion process in the solid matrix or the chemical reaction in the solid matrix is dominant over the other. For a fine porous sorbent particle, the diffusion process may be considered to be much faster compared to the reaction rate, in which case the $SO_2$ concentration throughout the particle will be uniform and equal to the gas-phase concentration. The reaction will then proceed throughout the volume of the particle, and may be expressed by a bulk-volume reactivity ($K_r$) for the entire dried particle. This reaction coefficient would depend upon the moisture content in the particle, primary lime particle size or available surface area, and the diffusivity of $SO_2$ in the solid material. In a specific dry-scrubbing application, the solid reagent, its source, and preparation method are set, and this leaves only the moisture content of the particle as a variable process parameter.

The rate of $SO_2$ removal by a single particle with this approach is given by:

$$N_s = K_r \left( \frac{\pi d_d^3}{6} \right) C_{SO_2,g} \, C_{remaining\,lime} \quad (19)$$

where $K_r = f$ (moisture content). Such a correlation between $K_r$ and moisture content should be obtained by well-designed experiments. This approach is simple and may also prove practical to use. The gas-phase $SO_2$ concentration $C_{SO_2,g}$, depends upon the rate of $SO_2$ removal by the dried particles and is determined by overall gas-phase mass balance. The concentration of remaining lime with time is determined by the above rate relation and mass balance over the particle.

SPRAY-DRYER INLET AND OPERATING PARAMETERS

The rate relations developed earlier in this paper describe the mass- and heat-transfer interactions between a single droplet/particle and the surrounding gas phase. The rate of drying and $SO_2$ removal are interrelated to bulk-gas and droplet properties. In addition, the bulk-gas properties also depend upon gas-inlet conditions, prescribed operating conditions, and gas flow and mixing within a spray chamber.

INLET-GAS SPECIFICATIONS

The primary inlet flue-gas specifications required are (1) volumetric gas flow rate; (2) inlet flue-gas temperature; (3) flue-gas composition and its molecular weight; (4) amount of water vapor present or the absolute humidity of the flue gas, or the adiabatic saturation temperature; and (5) $SO_2$ concentration.

Also important is the particulate-phase concentration/size distribution in the inlet flue gas and its available alkalinity. However, the dry-particulate with its alkaline content, entering the spray chamber along with the flue gas, is not considered to be effective in $SO_2$ removal in the spray chamber. Its concentration primarily comes when recycled in the slurry along with fresh lime sorbent or other reagent.

OPERATING PARAMETERS

There are basically five primary operating parameters which influence the bulk-gas properties at the spray-dryer outlet and $SO_2$ removal in the spray chamber;

1. Approach to saturation temperature at the spray-dryer outlet.
2. Stoichiometric ratio of fresh lime (sorbent) added in the atomized slurry to the amount of $SO_2$ in the inlet flue gas.
3. Recycle ratio of solids collected in spray dryer and particulate collection equipment in the spray-dryer feed slurry.
4. Droplet size distribution in sorbent feed slurry/solution.
5. Method of slurry preparation (slaking)--primary lime particle size distribution.

In the spray chamber, the gas is cooled and humidified (almost) adiabatically by evaporation of the water from the droplets. The temperature and absolute humidity of the gas phase at the spray-dryer outlet is then given by following the adiabatic saturation line on the air-water psychrometric chart from the flue-gas inlet conditions (ignoring any heat losses). Thus, predetermines the temperature and absolute humidity of the flue gas at the spray-dryer outlet.

The amount of moisture retained by the solids at the spray-dryer outlet is negligible compared to the amount of water evaporated. This, the amount of water added in the slurry per unit amount of inlet flue gas is simply obtained from the gas-phase humidities at the spray-dryer inlet and outlet.

The stoichiometric ratio in spray-dryer FGD operations is usually defined as moles of fresh lime or sorbent added in the slurry per mole of $SO_2$ in the inlet flue gas. Thus, setting the stoichiometric ratio determine the amount of fresh lime/sorbent used per unit amount of inlet flue gas. The recycle ratio further determines the amount of recycled solids (from particulate collection/-spray dryer) accompanying the fresh lime in the slurry. These three parameters fix the amount of total solids and water added in the slurry per unit amount of inlet flue gas, thus setting the solids concentration in the slurry.

The methods used for lime slaking, slurrying of recycled solids, and slurry preparation determine the average primary particle size in the slurry. The recycle ratio and the amount of active reagent in the waste solids influence the active available alkaline content in the primary lime particle in the slurry. This is turn determines the equilibrium concentration of lime in the solution. The method of atomization, slurry concentration, and slurry feed rate determine the size distribution and average size of the atomized droplets as well as total number of droplets generated per unit amount of flue gas.

The amount of $SO_2$ in the flue gas at spray-dryer outlet is the result of the operating parameters. It is a design parameter, and the purpose of this modeling and experimental pilot-plane study is to predict it as a function of various operating variables.

GAS-FLOW PATTERN AND MIXING IN SPRAY DRYER

The inlet and operating conditions specify the bulk-gas properties at the inlet and outlet. However, the rates of heat and mass transfer depend upon the local properties of the bulk gas in contact with the spray droplet. The local bulk-gas properties (temperature and $SO_2$ and water-vapor concentrations) are determined by the gas-flow pattern and mixing within the spray chamber. With the completely backmixed gas-flow pattern, the bulk-gas properties throughout the spray chamber are uniform and same as at the spray-dryer outlet. At the other extreme, when the spray dryer is operated as an ideal plug-flow system, the bulk-gas properties change gradually with the local rate of change of a property depending upon the local rate of transfer.

Plug-flow systems generally give greater transfer rates compared to backmixed systems. In a spray-dryer application, this means that the droplets will dry faster in a plug-flow system as opposed to a backmixed system. This indicates a shorter time span for wet-droplet stage in plug-flow spray-dryer application. The initial rate of $SO_2$ removal in wet-droplet stage in a plug-flow system would be higher than that in a backmixed system but will be operative for a shorter time period. Thus for $SO_2$ removal, plug flow systems offer higher initial $SO_2$ removal rates, whereas backmixed systems offer longer drying times.

The actual flow-gas pattern and mixing would be intermediate of the above two extremes. Usually a deliberate attempt is made for efficient gas mixing in a spray dryer by employing efficient gas-distribution systems, such as a dual gas-dispersion system. In such situations, the gas mixing is more closely approximated by the well backmixed case, with uniform gas-phase temperatures and compositions in the spray chamber.

MASS AND ENERGY BALANCES

Evaporation of water from droplets, and absorption and reaction of $SO_2$ in droplets, change the bulk properties and composition of both the gas phase and droplets. The rate relations developed earlier in this paper must be coupled with material and energy balances for both the gas phase and droplets to develop differential equations to describe the rate of change in the bulk properties (composition, mass, temperature, droplet diameter, etc.). These differential equations then must be integrated over the spray-dryer residence times of gas phase and droplets to obtain the overall removal of $SO_2$ in the spray chamber.

All the initial parameters/properties of the droplet established by the gas-phase inlet conditions and spray-dryer operating parameters just discussed in this paper. After establishing the initial conditions, the gas phase and the droplets are "followed" from the spray-dryer inlet to outlet to determine total change in both.

Since the rigorous two-dimensional momentum balance equation is not considered in the present model, it is enough to consider one-dimensional flow of droplets from top to bottom of the spray dryer. The droplets may be assumed to be uniformly distributed across the spray chamber cross section. The spray droplets may also be assumed to have the same residence time and means velocity as that given by the gas-phase volumetric flow rate and mean velocity. In case of plug-flow type gas-flow pattern, the gas phase is also assumed to travel cocurrently with the droplets from the top to bottom of the spray dryer. In case of backmixed-flow type gas-flow pattern, the gas phase is assumed to be uniformly mixed throughout the spray chamber and its properties are assumed to be those at the outlet. The spray droplets in this situation are exposed to constant gas atmosphere throughout the residence time.

The differential equations describing the rate of change in droplet properties, with respect to residence time or distance travelled in the spray dryer, can easily be derived using the rate relations developed before. For a broad droplet-size distribution, the size distribution may be divided into discrete size channels with a certain mean droplet size for each channel. Since the rate of transfer processes depend upon the droplet size, the differential equations for droplets need to be written for each size channel in the distribution.

Similar differential equations describing the rate of change in gas-phase properties, with respect to residence time or distance travelled in the spray dryer, can also be easily derived for a plug-flow type gas-flow pattern In the derivation of these equations, effect of entire droplet-size distribution on the gas phase needs to be considered. No such gas-phase balance equations are required for a completely backmixed gas-flow pattern since all the gas-phase properties are assumed to be uniform and the same as those at the spray-dryer outlet. The gas-phase temperature and humidity at the spray-dryer outlet are determined by operating conditions; however, the outlet $SO_2$ concentration is not known a priori. Therefore, a trial-and-error procedure is required to determine the efficiency of $SO_2$ removal and outlet $SO_2$ concentration in case of a backmixed range type gas-flow pattern.

COMPUTER PROGRAM

To solve the material and energy balance equations just described in this paper, using the rate relations developed earlier in this paper, a computer program, "SPRAYMOD," was written in Basic language. The computer was developed on a desk-top microcomputer.

The program basically has three sections. In the first section, a menu input format is used to enter all the input data regarding specifications and operating variables. After input, the data is printed out for verification. In the second section, gas-phase overall material and energy balances are carried out to establish all the initial conditions for both the droplet and the gas phase. All the dependent variables are then initialized.

In the third section, the differential equations for the droplets and for the gas phase (plug-flow option) are solved by a simple, explicit, finite-forward-difference scheme. The time step is controlled so that a maximum change during a time step in the droplet temperature or the droplet weight is less than 1% of the function value. This criterion ensured accurate solution in spite of the simple numerical scheme used for the solution. The program has two options regarding the gas-flow pattern: (1) backmixed flow and (2) plug flow. The backmixed-flow case requires a trial-and-error procedure to determine $SO_2$ removal efficiency. The backmixed flow assumption is often close to the real situation.

The program essentially follows a single spray droplet suspended in the bulk-gas phase with time. The changes in droplet and bulk-gas properties (e.g., droplet diameter) are related to rates of mass and heat transfer. The bulk-gas physical properties required in various rate relations are evaluate at the mean temperature of the gas film surrounding the droplet. The properties of the liquid phase, such as vapor pressure, are evaluated at the droplet temperature, which is assumed to be uniform throughout the droplet.

At initial time, T=0, all the bulk gas and droplet properties are initialized. If the backmixed flow option is used, first trial value of $SO_2$ removal efficiency need to be specified. At each time increment, the derivative functions are determined and the time step, DT, is established. The amount of water evaporated and $SO_2$ absorbed in time DT are then evaluated. Corresponding changes in all gas-phase and droplet variables during time step DT are determined. The calculations continue until no more $SO_2$ is removed by droplets or till the time reaches the residence time value.

PHYSICAL PARAMETERS NEEDED FOR THE MODEL

To determine the rate of drying of droplets, it is necessary to know the drying characteristics of the solids involved, i.e., the critical-moisture content and equilibrium-moisture content at 100% relative gas-phase humidity Other important parameters needed are the reaction-rate coefficients for both solid-phase and liquid-phase reactions between $SO_2$ and sorbent, which should be determined from well designed experimental studies. The droplet-size distribution strongly affects the gas-phase transfer coefficient and the drying times. The sorbent-dissolution rate, in case of a sparingly soluble sorbent such as lime, depends strongly upon the sorbent particle-size distribution in the slurry, which in turn depends upon the lime-slaking and slurry-preparation system. The gas-phase inlet conditions and spray-dryer operating parameters needed for model simulations were discussed earlier in this paper.

COMPARISON OF MODEL PREDICTIONS WITH PILOT-PLANT DATA

The predictions of $SO_2$ removal efficiency of a spray-dryer system by the model presented in this paper were compared with a set of pilot-plant data under various operating conditions. The pilot-plant data set used for comparison here was collected by Cottrell Environmental Sciences. Inc., at the Comanche Station of Public Service Company of Colorado (16). One of the difficulties in obtaining suitable data set for comparison was lack of complete information in various reported pilot-plant and full-scale studies. This particular data set was chosen because of its availability and extent or information; these pilot-plant studies were recently published by Stevens et al. (16).

In addition to various operating parameters, some physical parameters need to be specified in model simulations. The drying characteristics of solids used were: critical-moisture content of 30% by mass and an equilibrium-moisture content of 15% mass at 100% relative gas-phase humidity. The critical-moisture content value was considered to be at which the solid spheres start touching each other in the droplet, whereas the equilibrium-moisture content value was approximately determined from the measured moisture contents of the spray-dryer solids in this pilot-plant study (16). The information regarding reaction coefficients was not available in this report. For model simulations, the solid-phase reactivity was considered to be zero and that of liquid-phase reaction taken to be infinite. No measured atomized droplet-size distribution was available in this study, and the mean-droplet size inferred from the measured spray-dryer outlet solid-size distribution was taken as 50 $\mu$m (monodispersed). The lime particle-size distribution in slurry was available and was approximately monodispersed with a mean size of 4 $\mu$m. The gas-flow pattern in model simulations was assured to be completely backmixed.

The model comparison with the data is shown in Table 1 and FIG. [10]. The agreement was very good, with most of the model prediction being within 10% of data values. With closer approach to saturation, however, there was an underprediction of $SO_2$ removal efficiency. This is believed to be due to neglecting the solid-phase reactivity, which is expected to be significant at closer to approach to saturation, due to increased amount of equilibrium moisture in solids.

Case Studies

Additional model simulations were carried out to study the effect of stoichiometric ratio, approach to saturation, and inlet gas-phase temperature on $SO_2$ removal efficiency number otherwise similar operating conditions. All the physical parameters used were the same as just described.

FIG. [11] shows the effect of stoichiometric ratio on $SO_2$ removal efficiency as predicted by the model. As expected, the efficiency increases with increasing stoichiometric ratio, with a leveling off at higher ratios. The leveling off occurs due to reduced moisture content at higher stoichiometric ratios, which reduces the drying time and thus offsets the availability of greater amount of sorbent.

Closer approach to saturation at the spray-dryer outlet leads to improved performance of the spray dryer as seen in FIG. [12]. This is primarily due to increased amount of water in feed slurry, which increases the drying time of droplets.

Although marginal, the gas-inlet temperatures have an influence on removal efficiency. FIG. [13] indicates that higher inlet temperature increases removal efficiency. This is due to higher water requirements to cool and humidify the gas. This increases the moisture content in feed slurry and hence the drying time.

Numerous reported observations in the literature (4, 16) follow trends as shown in these simulations.

FIG. [14] shows a typical time history of a spray droplet in the spray dryer under the following operating conditions:

| | |
|---|---|
| Inlet gas temperature | $\approx 160°$ C. |
| Amount of water at inlet | $\approx 6.4\%$ by volume |
| $SO_2$ concentration at inlet | $\approx 800$ ppm |
| Approach to saturation temperature | $\approx 15°$ C. |
| Average droplet diameter | $\approx 50$ $\mu$m |
| Primary lime particle size | $\approx 4$ $\mu$m |
| Stoichiometric ratio | $\approx 1.0$ |
| No recycle | |
| Mass fraction of active sorbent in feed | $\approx 1.0$ |
| Critical moisture content | $\approx 50\%$ |
| Equilibrium moisture content at 100% relative humidity | $\approx 3\%$ |
| Completely backmixed flow system in spray chamber | |
| Volumetric reaction coefficient | |

| | |
|---|---|
| at 2% residual moisture in solids | $\approx 1 \times 10^7$ cm$^3$/gmole-sec |

The simulation above shows that, in this particular case, the droplet loses most of its moisture in the first couple of seconds, with the moisture content eventually approaching its equilibrium level. Most of the SO$_2$ is absorbed in the first stage of drying with SO$_2$ removal continuing at a slower rate in the dry stage.

SUMMARY AND CONCLUSIONS

1. A quantitative model is developed for various processes influencing SO$_2$ removal in a spray-dryer system.
2. A computer program, "SPRAYMOD," is written to solve resulting equations and to predict SO$_2$ removal efficiency of a spray-drying system.
3. Simulation case studies show expected trend of SO$_2$ removal efficiencies with various operating parameters, such as stoichiometric ratio and approach to saturation.
4. Comparison with one set of pilot-plant data shows good agreement between model predicted and observed SO$_2$ removal efficiencies.
5. Several key parameters influencing the process have been identified. Parameters, such as reaction-rate coefficients and critical-and equilibrium-moisture contents, need to be determined experimentally.

REFERENCES

1. Apple C., and Kelly, M. E. Mechanisms of dry SO$_2$ control processes. EPA-600/7-82-026 (NTIS PB82-196924), April 1982.
2. Getler, J. L., Shelton, H. L., and Furlong, D. A. Modeling the spray absorption process for SO$_2$ removal. *Journal of the Air Pollution Control Association*, 29(12), p. 1270, December 1979.
3. Downs, W., Sanders, W. J., and Miller, C. E. Control of SO$_2$ emissions by dry scrubbing. Presented at the American Power Conference, Chicago, Ill., Apr. 21–23, 1980.
4. Samuel, E. A., Lugar, T. W., Lapp, D. E., Murphy, K. R., Brna, T. G., and Ostop, R. L. Process characterization of SO$_2$ removal in spray absorber/baghouse systems. In: Proceedings: Eighth Symposium of Flue Gas Desulfurization, New Orleans, La., November 1983, Volume 2, EPA-600/9-84-017b (NTIS PB84-223049), July 1984.
5. Perry, R. H., and Chilton, C. H. (editors). Chemical engineers handbook. In: 5th edition, Chapter 20. McGraw-Hill, New York, 1973.
6. Sjenitzer, F. Spray drying. *Chem. Eng. Sci.*, Vol. 1, No. 3, pp. 101–117, 1952.
7. Kerkhof, P. J. A. M., and Schoeber, W. J. A. H. Theoretical modeling of the drying behavior of droplets in spray dryers. In: A. Spicer (ed.), Advances in Preconcentration and Dehydration of Foods. Wiley, New York, 1974.
8. Marshall, W. R., Jr. Heat and mass transfer in spray drying. *Trans. ASME*, Vol. 77, pp. 1377–1385, 1955.
9. Gauvin, W. H., and Katta S. Basic Concepts of spray dryer design. *AIChE J.*, Vol. 22, No. 4, pp. 713–724, 1976.
10. Crowe, G. T. Modeling spray-air contact in spray-drying systems. In: A. S. Mujumdar (ed.), Advances in Drying, Vol. 1. Hemisphere Publishing Corp., Washington, 1980.
11. Froessling, N. *Gerlands Beitr. Geophys.*, 52, 170, 1938.
12. Ranz, W. E., and Marshall, W. R., Jr. Evaporation from drops. *Chem. Eng. Prog.*, Vol. 48, pp. 141–46, 173–80, 1952.
13. van Brakel, J. Mass transfer in convective drying. In: A. S. Mujumdar (ed.), Advances in Drying, Vol. 1. Hemisphere Publishing Corp., Washington, 1980.
14. Parti, M., and Palancz, B. Mathematical model for spray drying. *Chem. Eng. Sci.*, Vol. 29, pp. 355–362, 1974.
15. Felsvang, K. Results of high sulfur dry-FGD operation. Presented at the Joy/Niro Seminar, Minneapolis, June 1982.
16. Stevens, N. J., Manavizadeh, G. B., Taylor, G. W., and Widico, M. J. Pilot-scale parametric testing of spray dryer SO$_2$ scrubber for low-to-moderate sulfur coal utility applications, EPA-600/7-84-045 (NTIS PB84-175959), March 1984.
17. Danckwerts, P. V. Gas Liquid reactions. McGraw-Hill, New York, 1970.
18. Damle, A. S. Modeling of SO$_2$ removal in spray dryer flue-gas desulfurization system. Draft report, submitted to U.S. Environmental Protection Agency under Cooperative Agreement No. CR-808936-02-0, July 1984.

TABLE 1

COMPARISON OF SO$_2$ REMOVAL EFFICIENCIES PREDICTED BY MODEL TO THOSE OBSERVED IN RESEARCH COTTRELL PILOT-PLANT DATA (16)

| Run Number | Inlet Gas Temperature (°F.)* | Adiabatic Saturation Temperature (°F.)* | Approach to Saturation (°F.) | Stoichiometric Ratio | Inlet SO$_2$ Concentration (ppm) | Observed SO$_2$ Removal Efficiency (%) | SO$_2$ Removal Efficiency Predicted by Model (%) |
|---|---|---|---|---|---|---|---|
| 101 | 334 | 125 | 69 | 3.26 | 780 | 57.7 | 58.6 |
| 104 | 340 | 125 | 33 | 1.69 | 710 | 76.8 | 70.4 |
| 105 | 301 | 126 | 74 | 2.36 | 780 | 44.9 | 46.4 |
| 107 | 300 | 126 | 52 | 2.70 | 730 | 56.2 | 61.4 |
| 109 | 307 | 126 | 62 | 1.28 | 800 | 45.0 | 36.3 |
| 111 | 301 | 126 | 34 | 1.62 | 780 | 65.4 | 65.4 |
| 112 | 307 | 126 | 22 | 1.55 | 750 | 81.3 | 79.8 |
| 115 | 256 | 126 | 31 | 1.56 | 770 | 61.0 | 64.0 |
| 116 | 261 | 127 | 15 | 1.30 | 800 | 71.2 | 77.5 |
| 118 | 340 | 125 | 15 | 1.31 | 810 | 82.7 | 86.4 |
| 120 | 341 | 124 | 61 | 1.35 | 790 | 49.4 | 39.2 |
| 125 | 262 | 126 | 18 | 0.71 | 800 | 65.0 | 50.0 |
| 126 | 264 | 126 | 18 | 0.99 | 800 | 67.5 | 62.6 |
| 130 | 340 | 125 | 20 | 1.17 | 800 | 73.8 | 68.8 |

TABLE 1-continued

COMPARISON OF SO₂ REMOVAL EFFICIENCIES PREDICTED BY MODEL TO THOSE OBSERVED IN RESEARCH COTTRELL PILOT-PLANT DATA (16)

| Run Number | Inlet Gas Temperature (°F.)* | Adiabatic Saturation Temperature (°F.)* | Approach to Saturation (°F.) | Stoichiometric Ratio | Inlet SO₂ Concentration (ppm) | Observed SO₂ Removal Efficiency (%) | SO₂ Removal Efficiency Predicted by Model (%) |
|---|---|---|---|---|---|---|---|
| 131 | 342 | 123 | 22 | 0.72 | 800 | 55.0 | 42.0 |

Note: Recycle ratio = 0.
*Use the equation °C. = 5/9(°F. - 32) to convert the equivalent metric unit. —.

The alkali used in the process may be injected as a clear solution (as is possible with a material such as sodium bicarbonate or sodium carbonate) or as a slurry (as is possible with a material such as sodium bicarbonate or sodium carbonate) or as a slurry (as is the case for lime or limestone). The choice of reagent, the reagent concentration and the injection rate all depend on the levels of SO₂ control desired and the problems associated with disposal of the waste solid.

The sodium based reagents such as sodium carbonate will give SO₂ removal efficiencies of 90+% for SO₂ concentrations of about 2000 ppm with an injection rate of 15 gallons of 15% by weight solution per hour for each 1,000 actual cubic feet per minute of gas cleaned. For the same concentration (2000 ppm) of SO₂, removal of 50 to 60% can be obtained by injecting a 15% by weight lime slurry at the rate of 15 gallons per hour of slurry per 1,000 actual cubic feet of gas per minute.

Additional improvement in SO₂ collection can be obtained by injecting the liquid in two different locations. The second injection location should be located 2 to 4 feet downstream from the first injection location. Injecting the liquid in two locations provides two reaction zones, at least as much the primary reaction is of the SO₂ gas with evaporating liquid drops. Because this reaction of SO₂ with the evaporating drops is the most efficient reaction for SO₂ control, multiple injection will give improved performance when compared to single point injection. Note that more than two injection locations can be used in multiple injection if space is available.

The E-SOX invention is based on two principals. The first is the aforementioned $SO_x$ removal system. The second is multi-stage ESP technology. In multi-stage ESP technology units of charger-collector sections are linked together to provide highly efficient particulate control.

The particle charging is done in the charger section which is optimized for particle charging. The discharge and collector geometries, gas velocities, and rapping are all optimized to produce the highest possible particle charge. Examples of particle chargers are the cold-pipe charger and the trielectrode charger, which are respectively disclosed in U.S. Pat. No. 4,431,434 to Rivard et al and 4,233,037 to Pontius et al. The cold-pipe particle charger precedes a particle collector stage whose primary purpose is to collect the particles that have had a charge placed on them in passing through the cold-pipe charger. In a cold-pipe charger, such as that disclosed in U.S. Pat. No. 4,431,434 the charger includes a collector electrode consisting of a system of pipes through which a cooling fluid passes that reduces the temperature of the passing gas. In addition the charger has wire electrodes adjacent to and parallel to the pipe electrodes. The wires, as contemplated by this invention, are connected to the negative terminal of a source of high voltage D.C. power and are thus negatively charged.

The hollow pipe electrodes are connected to ground or to a power source of opposite charge to that of the wires. Although the cooled pipes have a tendency to collect particles charged by the wires, the major collection of particles occurs downstream of the charger at the collector stage of the electrostatic precipitator. The cold-pipe charger of U.S. Pat. No. 4,431,434 could be used in the instant invention. Best performance is achieved from the multi-stage ESP when the collector uses a wire plate configuration, and especially when the wires are large diameter (¼ inch to ½ inch). various collector configurations can be used as appropriate. The charger-collector units are preferably arranged in multi-stages to provide collection of material that is reentrained or sneaks past the first unit. Two or three units in series should be sufficient to allow a plant to meet applicable particulate emission limits. The multistage ESP provides significantly improved collection efficiency performance over conventional ESPs. It is sufficiently effective to allow reaction space to be made available in an existing ESP for retrofit of the aforementioned $SO_x$ removal system and still allow particulate removal requirements to be achieved.

It is essential that the process be designed to maximize SO₂ collection and minimize problems in the particulate control portion of the system. This requires that the solid material entering the particulate control system be essentially dry. This requirement can be met by selecting nozzles that produce drops preferably in the range of 5 to 20 micrometers in diameter. The exact diameter will depend on the given situation In cases where available time for SO₂ control is limited, as for example, when the distance between the nozzles and the particulate control (ESP) units is short, as in a pilot plant, drops as small as 5 micrometers in diameter should be used. In cases where the time available for SO₂ control is relatively long (4 to 6 seconds), as in a full size plant, drops with diameters as large as 60 micrometers can be used.

DESCRIPTION OF THE PREFERRED EMBODIMENTS

Figure 1:
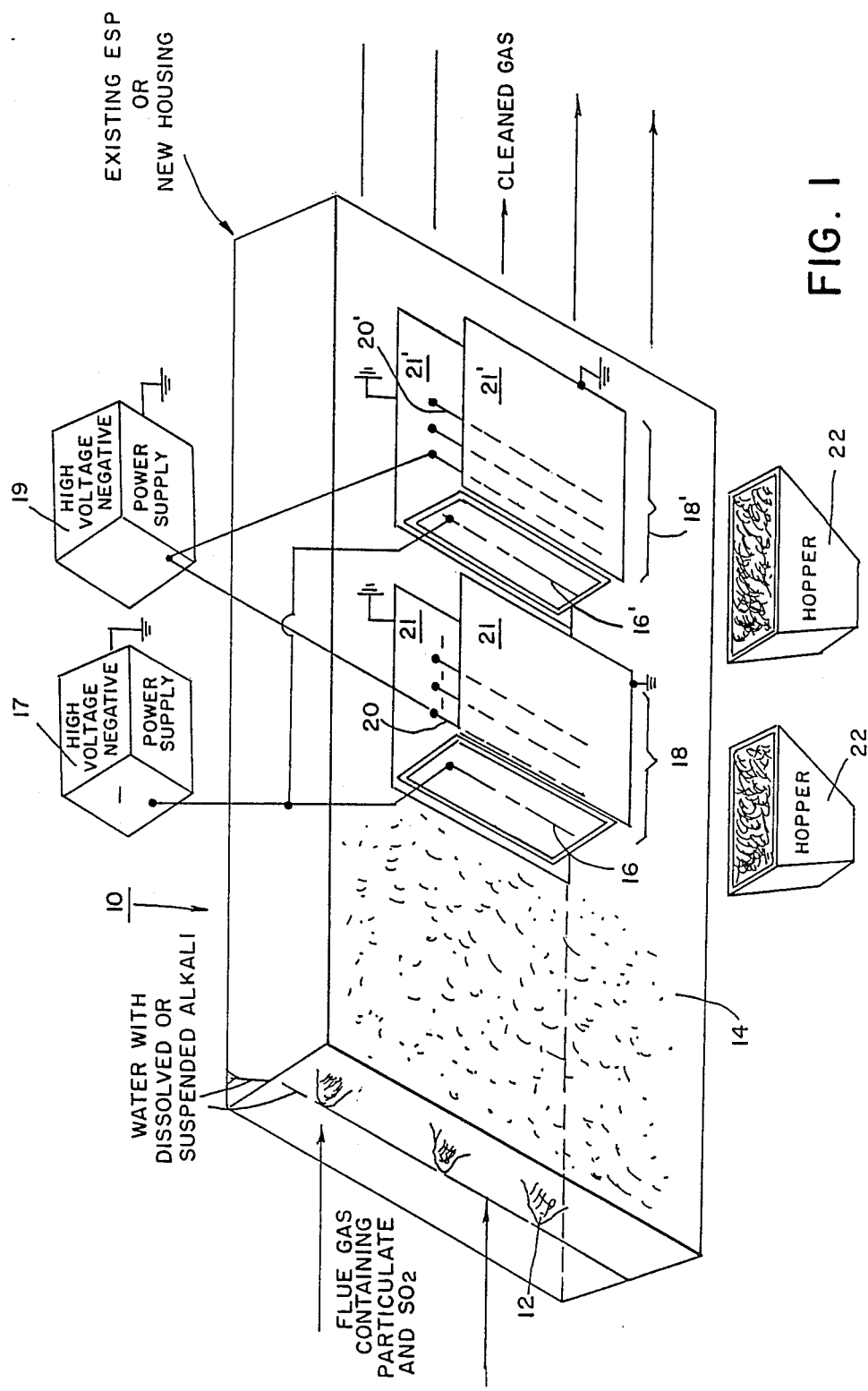
FIG. 1 is a partially schematic representation of a preferred apparatus according to the present invention.

Flue gas (at about 300° F.) containing particulates and $SO_x$ enter apparatus 10 and flows past nozzles or atomizers 12. The nozzles 12 spray the flue gas with an aqueous solution of an alkaline neutralizing agent, preferably sodium bicarbonate or calcium carbonate.

The sprayed flue gas then flows into reaction zone 14 between nozzles 12 and a particle charger 16. In reaction zone 14, $SO_x$ first dissolves n the aqueous neutralizing solution and then reacts with the neutralizing agents therein to produce dissolved neutral salts. As evaporation of water and cooling of the flue gas occurs, the dissolved salts precipitates as neutral, wet salts. The temperature of the flue gas entering the housing reaction assists in the evaporation of water so that, by the time the flue gas has reached the end of reaction zone 14 and the charger 16, the flue gas and particles therein are essentially dry. Because the above process for the removal of $SO_x$ removes heat by evaporation of moisture, the temperature of the gas being electrostatically filtered is lowered from about 300° F. to about 180° F.

To save space, the reaction zone should be of a size about equal to that required to dry the wet neutral salts formed by the reaction of the neutralizing agent spray droplets with the flue gas. The lifetime, t, in seconds, of a droplet is given by the equation $$t = 0.009706 + 0.00002579 d^2$$

where d is the droplet diameter in micrometers. Therefore, the reaction zone should be of a size about equal to $t \times f$, where f is the gaseous flow rate in the reaction zone, in units of distance per second. As the droplet diameters of an atomized spray are generally uniform, the average droplet diameter is a good indicator of the actual droplet diameter of any one droplet.

The charger 16 is connected to a high voltage D.C. power supply 17. Preferably it is connected to the negative terminal of the power supply. The particles receive a negative charge as they pass the charger 16 and are removed from the gas stream by an electrostatic precipitator (ESP) module 18. The module 18 comprises discharge electrode wires 20 that are connected to a high voltage D.C. power supply 19. Preferably the wires 20 are connected to the negative terminal of the power supply. The module 18 also comprises collector plates 21 that are spaced from the discharge wires 20. The plates 21 are connected to the positive terminal of the power supply 19, or are otherwise provided with a charge opposite to that of the wires 20 and the charger 16. Thus, as the charged particles pass through the module 18, the negatively charged particles are repelled by the wires 20 and attracted to and adhere to the positively charged plates 21. Once on the plates 21, the particles may be removed therefrom by any conventional means, such as a mechanical hammer or scraper (not shown) to fall into a hopper 22. A second multistage precipitator unit, having parts 16', 20', 21' and 22' corresponding to parts 16, 20, 21 and 22 of the first filter unit, works in the same manner as the first filter unit to remove material uncaptured or reentrained in the first module. Additional modules may be added.

Figure 2:
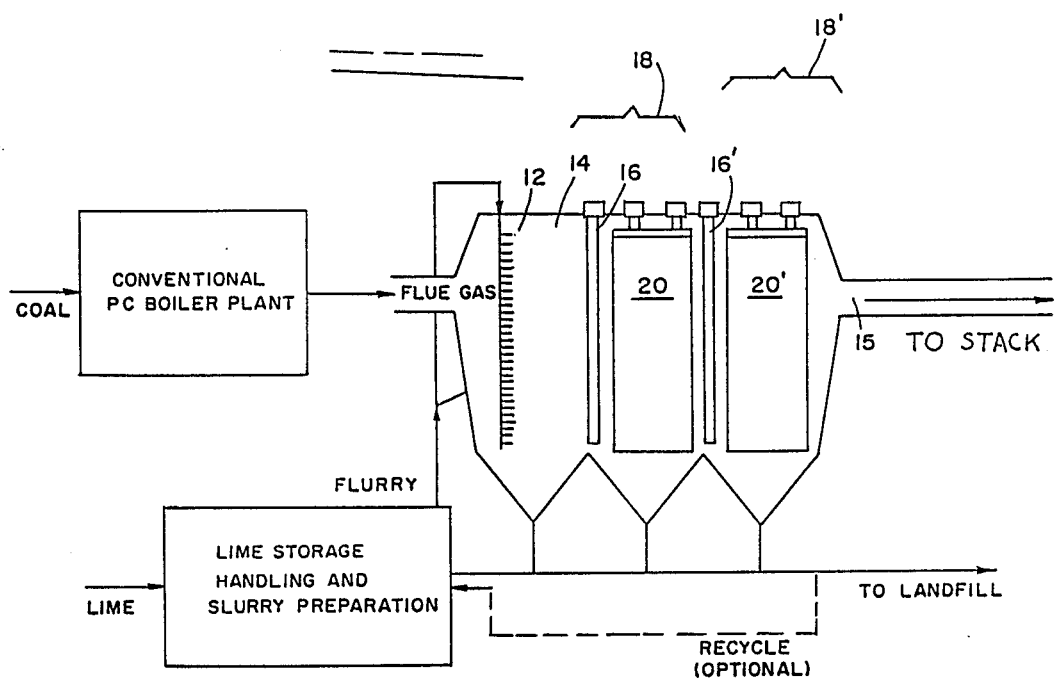
FIG. 2 is a schematic representation of a preferred, retrofit arrangement according to the present invention.

In FIG. 2, an overall schematic representation of the present invention is set forth. Flue gas from a conventional boiler plant 24 passes into the system of the present invention (described with reference to FIG. 1), through entry port 11, whereupon cleaned gasses are released, through exit port 15 to a separated from the neutral salts by conventional means and recycled to a slurry preparation and storage facility 26 or the neutral salts may be regenerated to form recallable neutralizing agent. Neutralizing agent and water from the slurry preparation facility is sprayed through nozzles 12 into the incoming flue gas.

Figure 3:
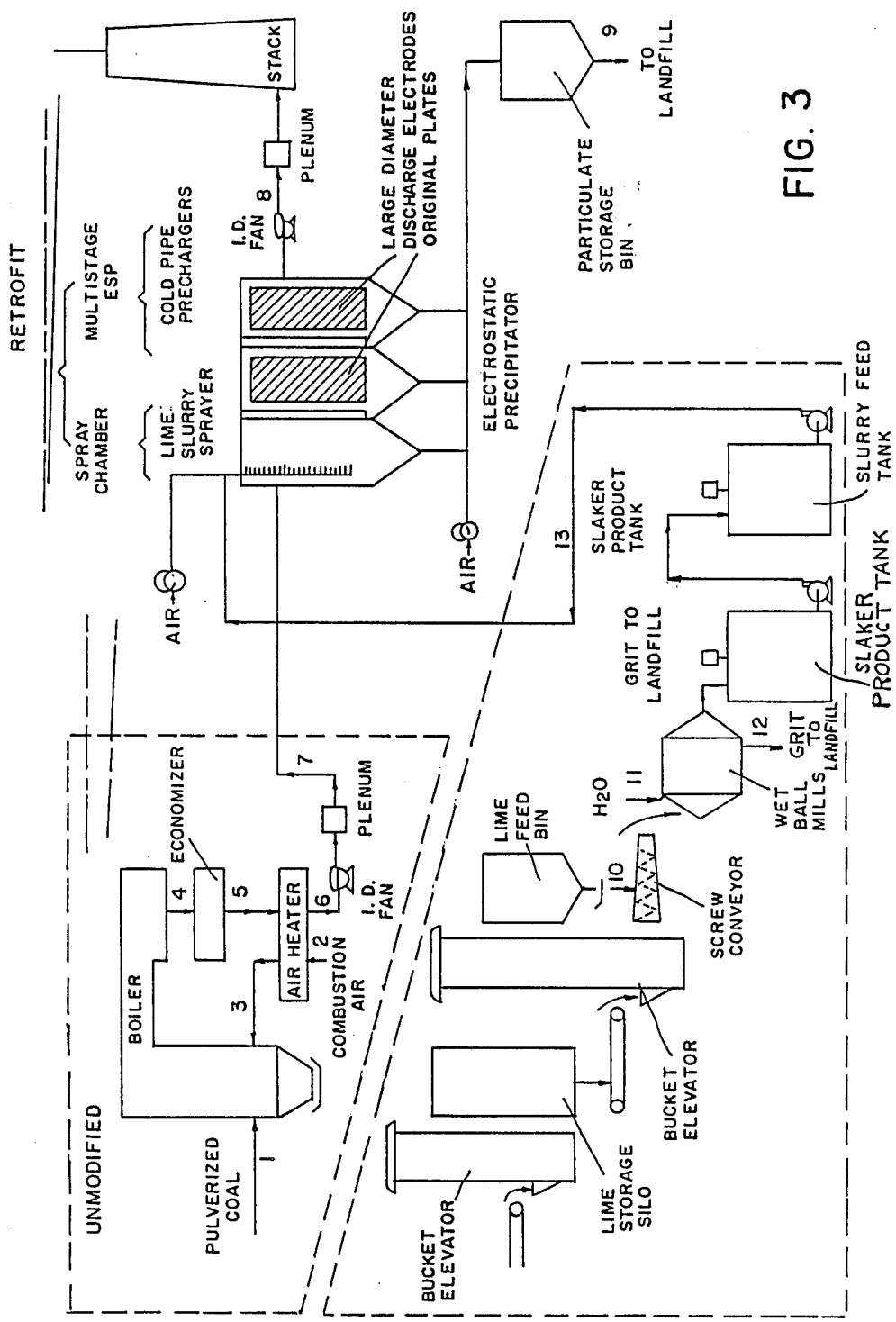
FIG. 3 is a schematic flow chart illustrating the process of the present invention in a retrofit environment.

FIG. 3 shows, in schematic form, a flow diagram illustrating the principles of the present invention, as operative in a boiler plant retrofit for the present invention. In step 1, pulverized coal is placed in a boiler. In step 2, air for combustion is heated by an air heater. In step 3, the heated air is mixed with the coal in the boiler. The exhaust fumes from the boiler are, in step 4, passed through an economizer, which, in step 5, passes the hot air through the air heater for indirect heat exchange with the incoming air. In step 6, the warm air (about 300° F.) is passed from the air heater to an induced draft (I.D.) fan. The air is then exhausted through a plenum in step 7. The above process is well known.

However, in accordance with this invention, air from step 7 is mixed with a lime slurry which is forced into a spray 12 by the force of air drawn in from outside. The apparatus and process for spraying and electrostatically filtering the fumes are the same as these described with reference to FIG. 1 and FIG. 2 and will not be described further herein. After the gas has been cleaned, a second I.D. fan, in step 8, blows the cleaned air through a plenum and out of the stack. Waste particles collected during electrostatic precipitation are forced by air into a particulate storage bin and then are taken to a landfill in step 9.

Lime (or other neutralizing agents) are placed in a bucket elevator, which empties the lime into a lime storage silo. The lime storage silo empties stored lime into a tray which empties into a second bucket elevator. The second bucket elevator feeds into a lime feed bin. In step 10, the lime feed bin feeds the lime into screw conveyor 10. The screw conveyor conveys the lime to a wet ball mill, where water is added to the lime and wet ball milling proceeds in step 11. The grit from the wet ball mill is removed and taken to a landfill. In step 12, the wet milled lime enters a slaker tank. The wet-milled, slaked lime is then passed from the slaker tank into a slurry feed tank. In step 13, the contents of the slurry tank are passed through the nozzle and used to spray incoming flue gases.

Retrofiting of an existing unit with E-SOX is done entirely within an ESP housing; the boiler is not affected. It is expected that E-SOX can be retrofitted during a normal, planned boiler outage and will not require expensive down time. The spray nozzle array, cold pipe prechargers, and large diameter wires are prefabricated prior to the outage.

The E-SOX technology consists of freeing up space within the ESP to allow the injection of an alkaline reactant to capture the $SO_2$. The freeing up of the space is accomplished by upgrading the effectiveness of a conventional ESP so that it will not only collect the original fly ash in the flue gas, but also the products of the above described reaction of $SO_x$ and the injected alkaline materials.

The ESP performance is upgraded by using a U.S. Environmental Protection Agency (EPA) developed multi-staging technology. Multi-staging works by putting a particle charger, such as the cold-pipe charger of U.S. Pat. No. 4,431,434, at the inlet of each collector stage 18, 18'. Simultaneously, the collector stages are upgraded by replacing the commonly used discharge wires, which are nominally ⅛ inch diameter with larger wires that are about ¼ to ½ inch diameter. U.S. Pat. No. 4,518,401 to Pontius et al deals with the advantages of using larger diameter wires in an ESP. These changes to the ESP, which separate and optimize the charging and collecting steps, provide an order-of-magnitude improvement in performance thereby allowing space to be freed up from the $SO_2$ removal.

The E-SOX process has been run by EPA at its in-house facility at Research Triangle Park, North Carolina with both sodium carbonate and common hydrated lime slurry as the adsorbents. The $SO_2$ collection with sodium carbonate solution was as high as 90%. The less reactive lime slurry gave a 60% efficiency. The stoichiometry for the lime reaction was 1.85:1. The E-SOX process has operated far from the adiabatic saturation temperature (50° F.) which suggests that the process will be forgiving and relatively trouble free.

The ESP portion of the E-SOX process operates in a favorable regime. The lowered temperatures and high moisture conditions suggest that particle resistivity will be low to moderate thereby improving ESP particle collection efficiency. The lowered temperature in the ESP increases the gas density and consequently the Specific Collector Area (SCA).[1] The lowered temperature also allows the ESP to operate at higher voltages which improve the collection. In addition, there is potential for improving $SO_x$ removal performance by such techniques as recycle of absorbent and staging of the spray injection nozzles.

[1]"Square Geet of Collector Srea per 1000 actual cubic feet per minute of gas flowing."

No operating problems were noted on the in-house facility. The droplets, in the size range that were used, dried in less than ½ second, no hardened deposits were found on the ESP electrodes and plates. It should be understood that in a full sized ESP larger droplets would be used because a typical residence time that could be freed-up might be two seconds.

The installation of $SO_2$ neutralization systems in ductwork from the boiler to the conventional electrofilter requires that the boiler be shut down for a significant amount of time during installation. This down time greatly increases the installation cost of conventional $SO_2$ removal systems in plants having an electrostatic filter. During the down time, ductwork is rerouted and realigned. In and of itself, the necessary rerouting and realignment requires significant labor and has made retrofitting with prior art $SO_2$ removal systems impractical.

As most presently operating electrical power plants and industrial boilers are already equipped with electrostatic filters which are housed in non-expandable modules of limited space, the down time and the ductwork realignment required to retrofit plants and boilers with prior art $SO_2$ removal systems has severely hampered efforts to reduce $SO_2$ emissions from these sources. Yet, the ecological need for reducing $SO_2$ emissions remains.

A major advantage of the present invention resides in the ease with which existing units may be retrofit to accommodate it. As stated earlier, the prior $SO_2$ removal systems, including that described by Kisters et al, were installed in the ductwork leading from the boiler to the conventional electrofilter, since the addition of the $SO_2$ removal system inside the housing of the electrostatic precipitator module of a conventional electrostatic precipitator in a preexisting plant would exceed the spatial capacity of the module.

However, the replacement of a conventional electrostatic precipitator unit with a multi-stage electrostatic precipitator that includes a particle charger results in an order of magnitude improvement in cleaning performance without any increase in the space occupied. Therefore, the number of conventional ESP units in the precipitator housing may be reduced by about ⅓, freeing space within the module for the addition of $SO_2$ removal system according to the present invention. Since the $SO_2$ system is within in ESP module, and not the ductwork, the ductwork need not be rerouted and realigned during a retrofitting. A considerable saving of time and money thus results.

The amount of neutralizing agent needed can be determined both empirically and theoretically by knowing the amount of $SO_2$ in the incoming flue gas and the amount of $SO_2$ required to be removed. The amount of water added and the size of the droplets likewise may be determined both theoretically and empirically, based on the amount and type of neutralizing agent used, the temperature and speed of the incoming flue gas, and the length of the reaction zone prior to the electrostatic filters. It is absolutely essential that the water added essentially completely evaporates prior to the entry of the gas into the electrostatic filter units, so that the particulate matter in the gas is essentially dry when entering the precipitator.

Monitoring and control of the process according to the present invention may be achieved in the manner described in Kisters et al. Thus, various parameters may be quickly and easily adjusted to accommodate varying conditions within the boiler.

Figure 4:
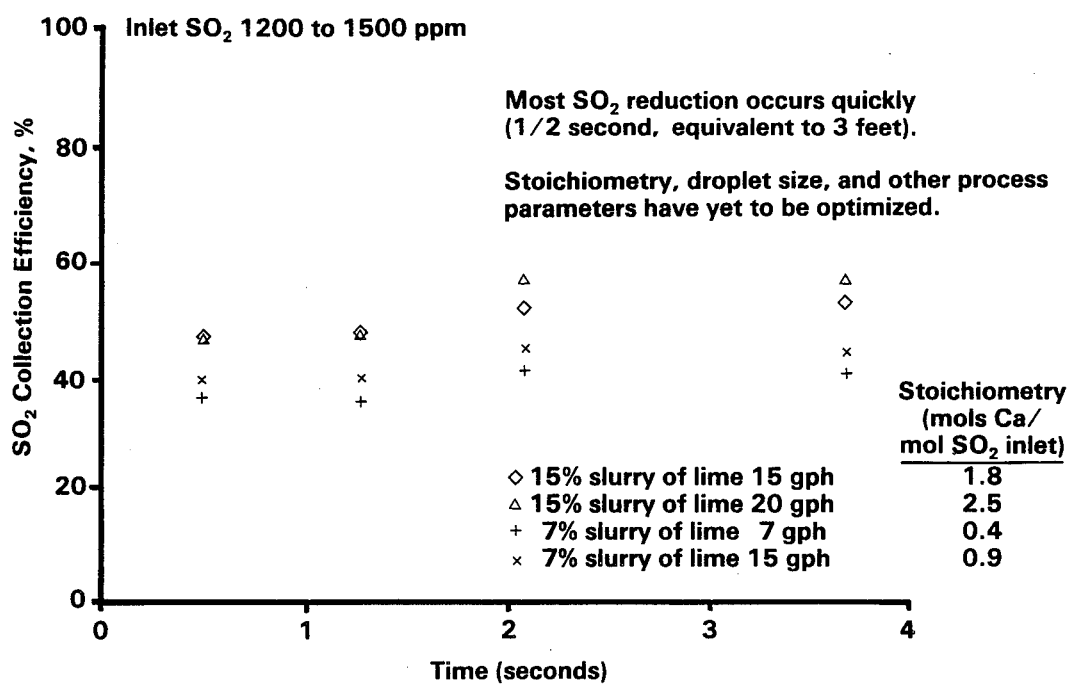
FIG. 4 is a graph of SO₂ collection efficiency vs. time in the reaction zone, when a lime slurry is used as the neutralizing substance.
Figure 5:
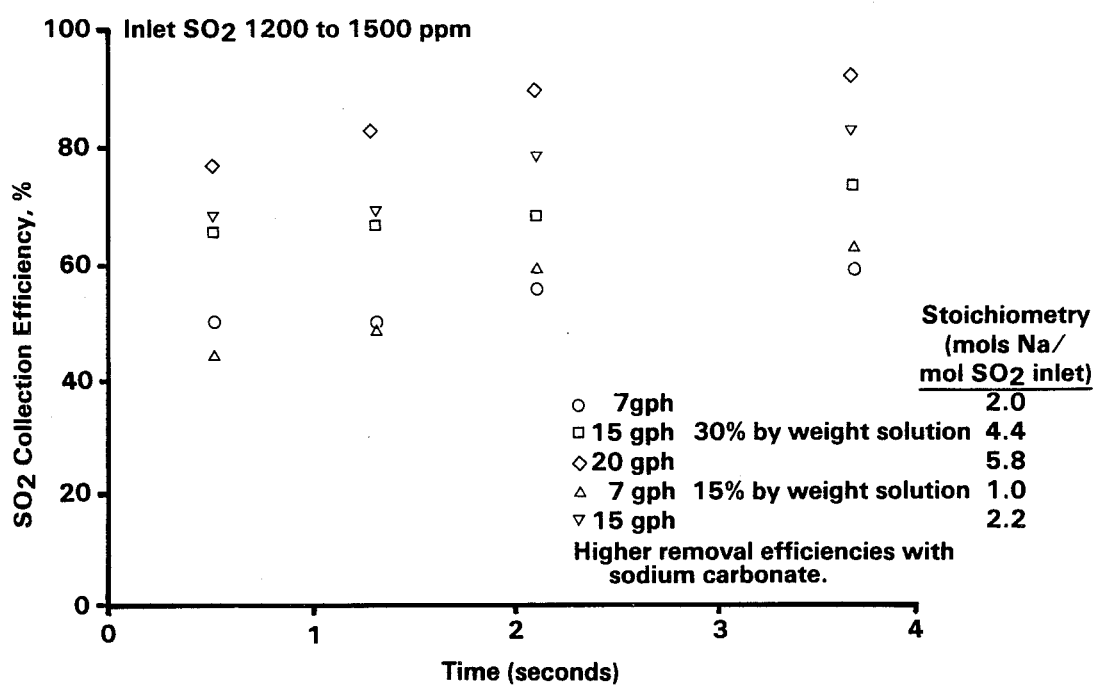
FIG. 5 is a graph of SO₂ collection efficiency vs. time in the reaction zone, when sodium carbonate is used as the neutralizing agent.

FIGS. 4 and 5 are self explanatory and show the $SO_2$ collection efficiency of the present invention for lime and sodium carbonate neutralizing agents, respectively.

Figure 6:
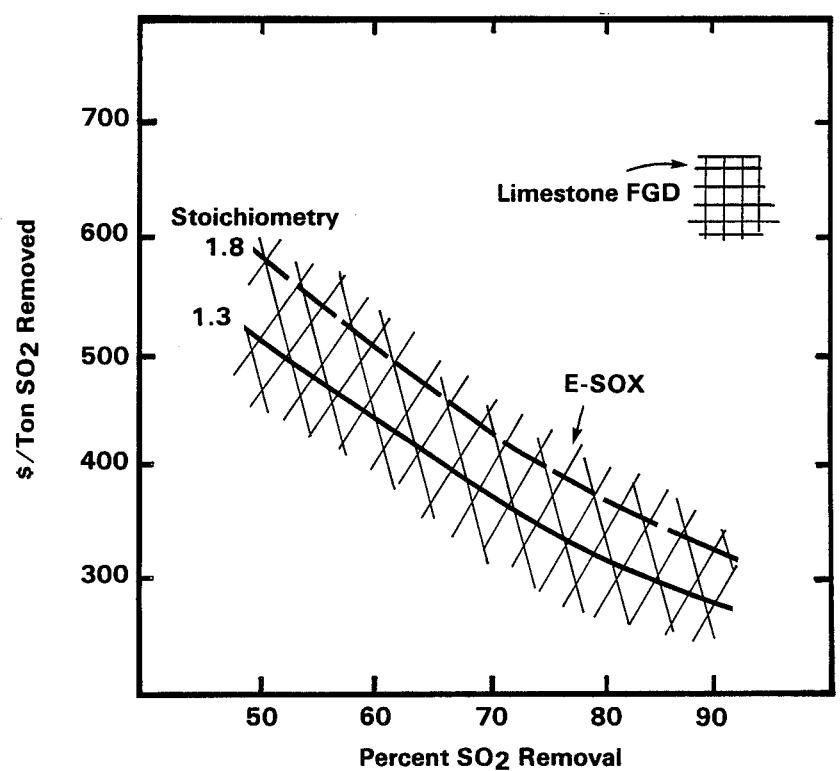
FIG. 6 is a graph illustrating the cost per ton SO₂ removed, in 1984 dollars, vs. the percent SO₂ removed.
Figure 7:
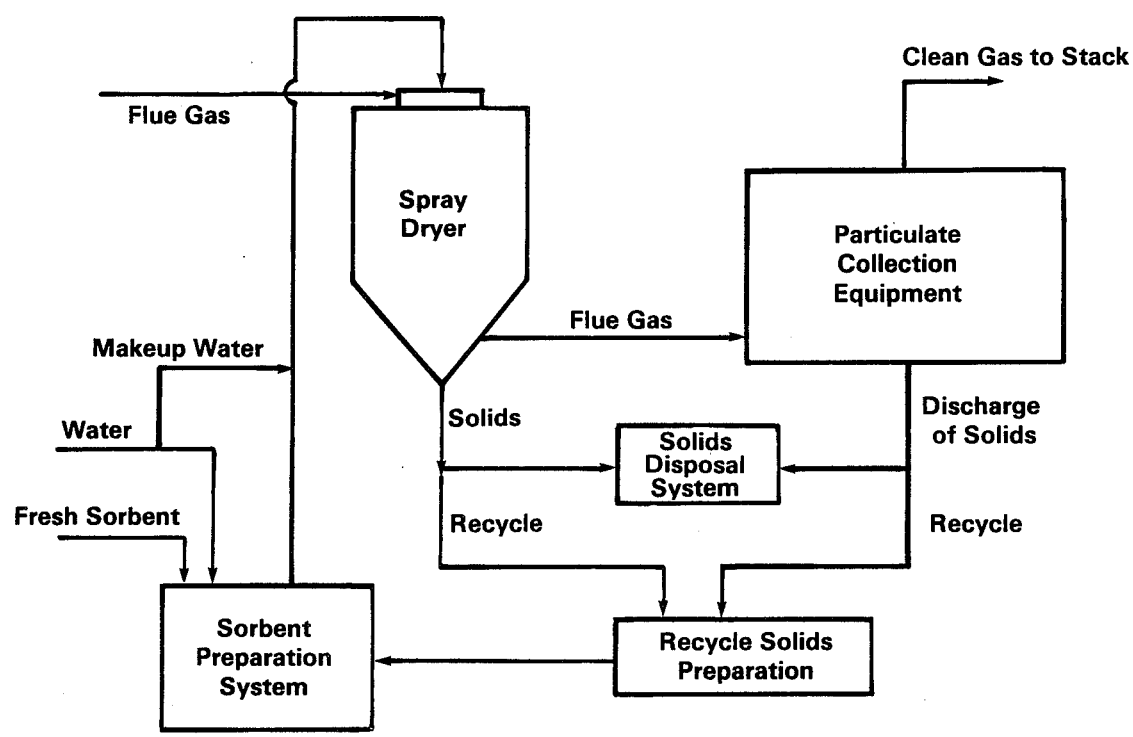
FIG. 7 is a simplified flow diagram of a spray-dryer FGD system.
Figure 8A:
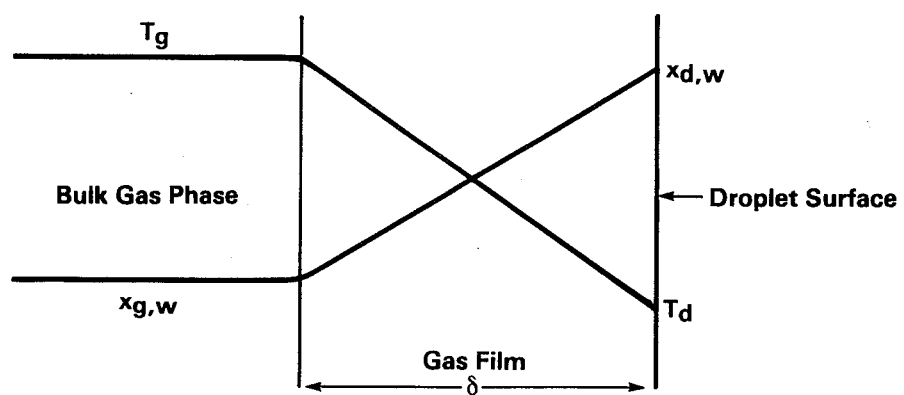
FIG. 8a is a graph of gas-phase concentration and temperature gradients near a moving droplet.
Figure 8B:
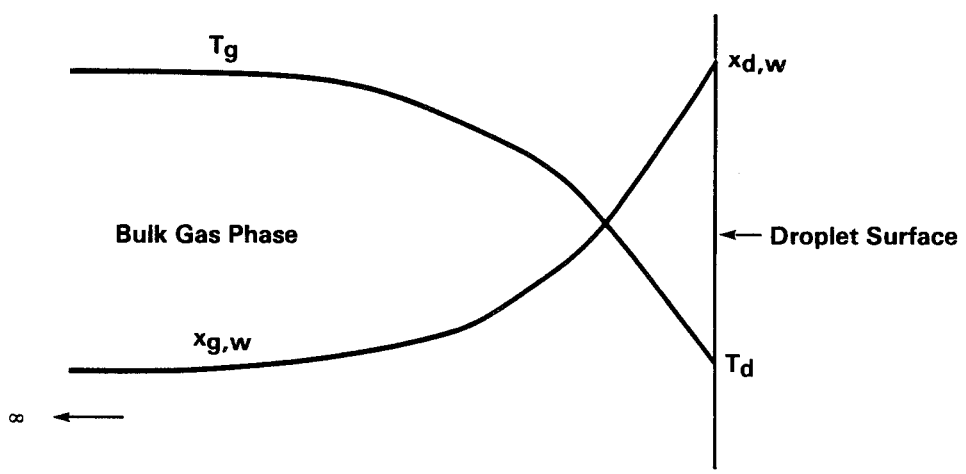
FIG. 8b is a schematic of quiescent droplet-gas system.
Figure 9:
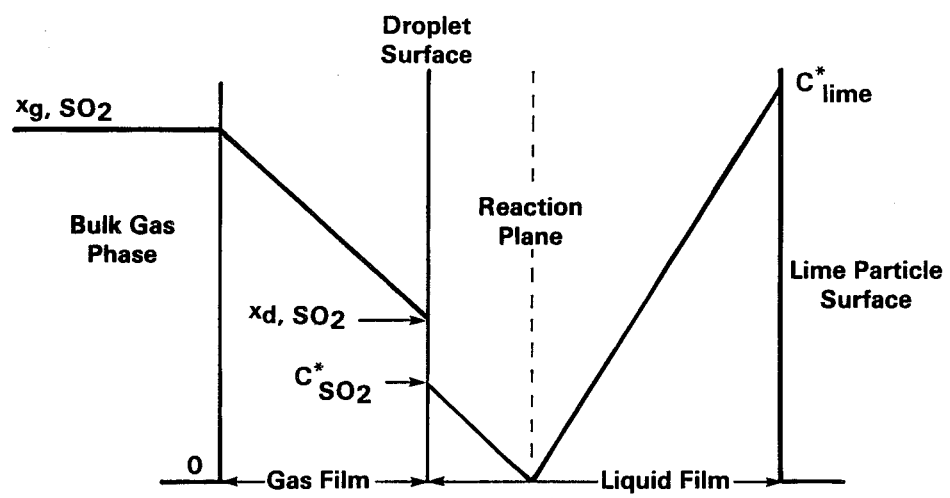
FIG. 9 is a schematic of $SO_2$ absorption/reaction in a wet droplet.
Figure 10:
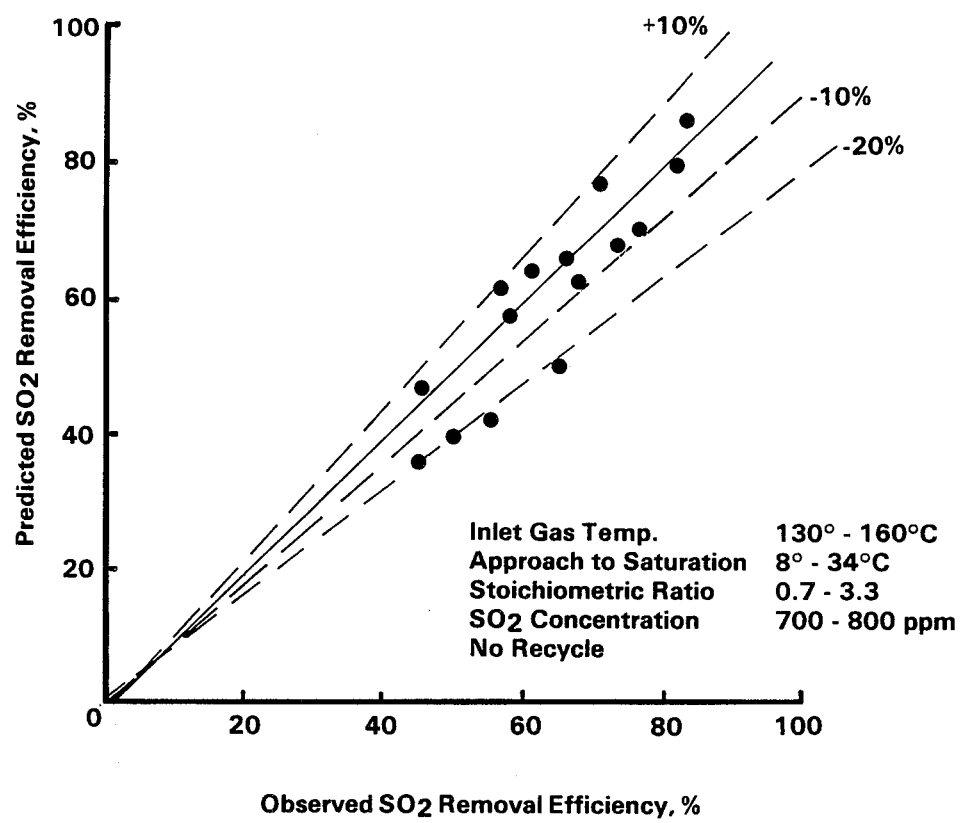
FIG. 10 is a graph comparing predicted and observed $SO_2$ removal efficiencies under various operating conditions. Source of data points: Stevens et al. (16).
Figure 11:
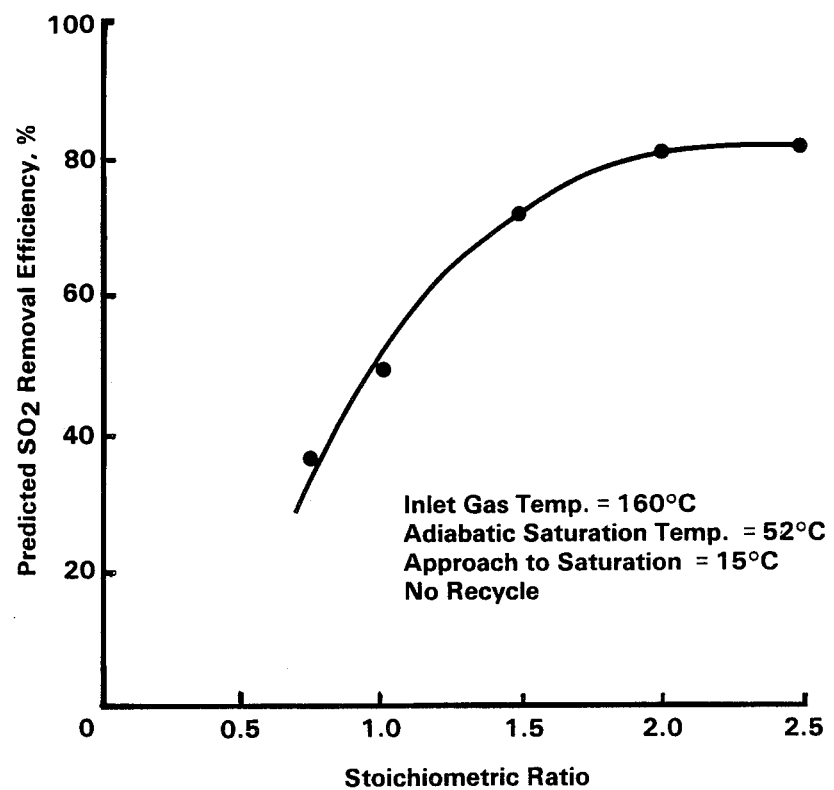
FIG. 11 is a graph showing the effect of stoichiometric ratio on $SO_2$ removal efficiency (points represent cases simulated by the model).
Figure 12:
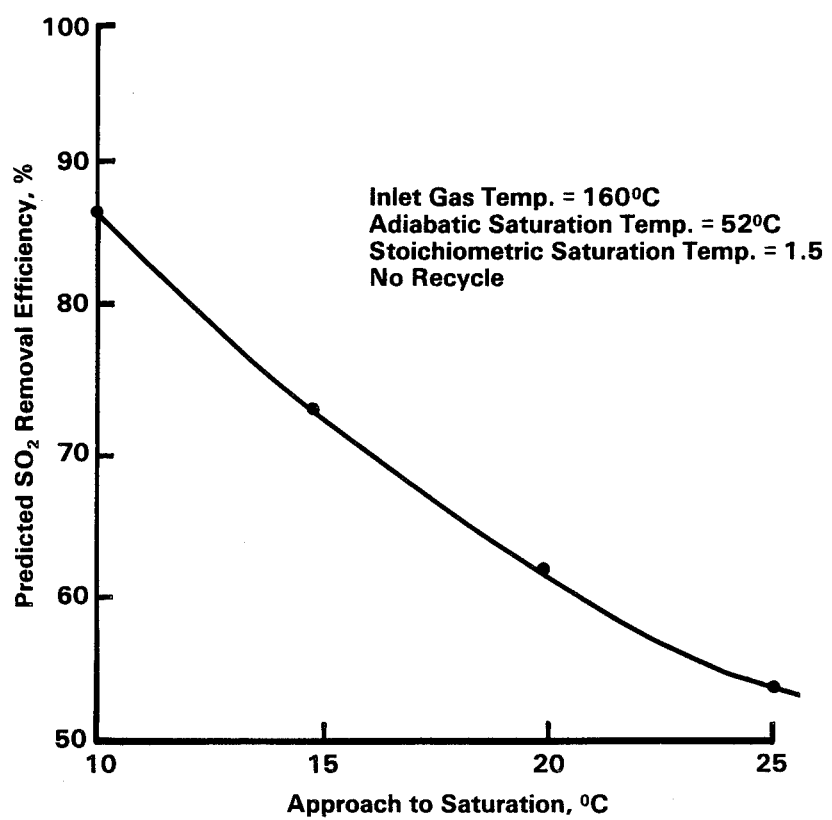
FIG. 12 is a graph showing the effect of approach to saturation on $SO_2$ removal efficiency (points represent cases simulated by the model).
Figure 13:
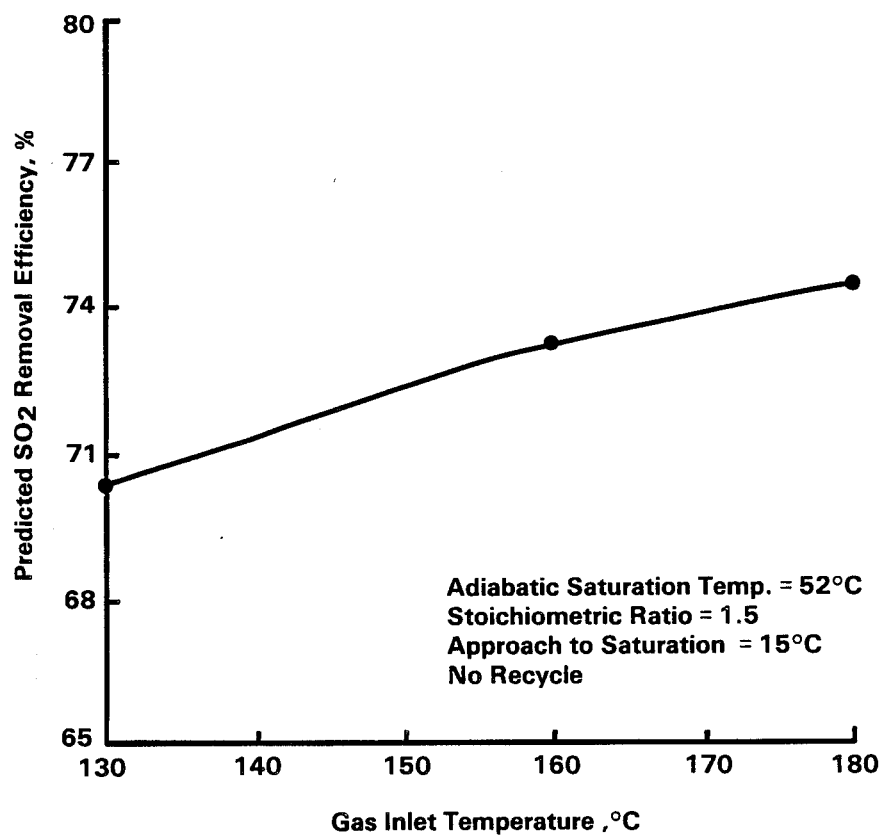
FIG. 13 is a graph showing the effect of gas-inlet temperature on $SO_2$ removal efficiency (points represent cases simulated by the model).
Figure 14:
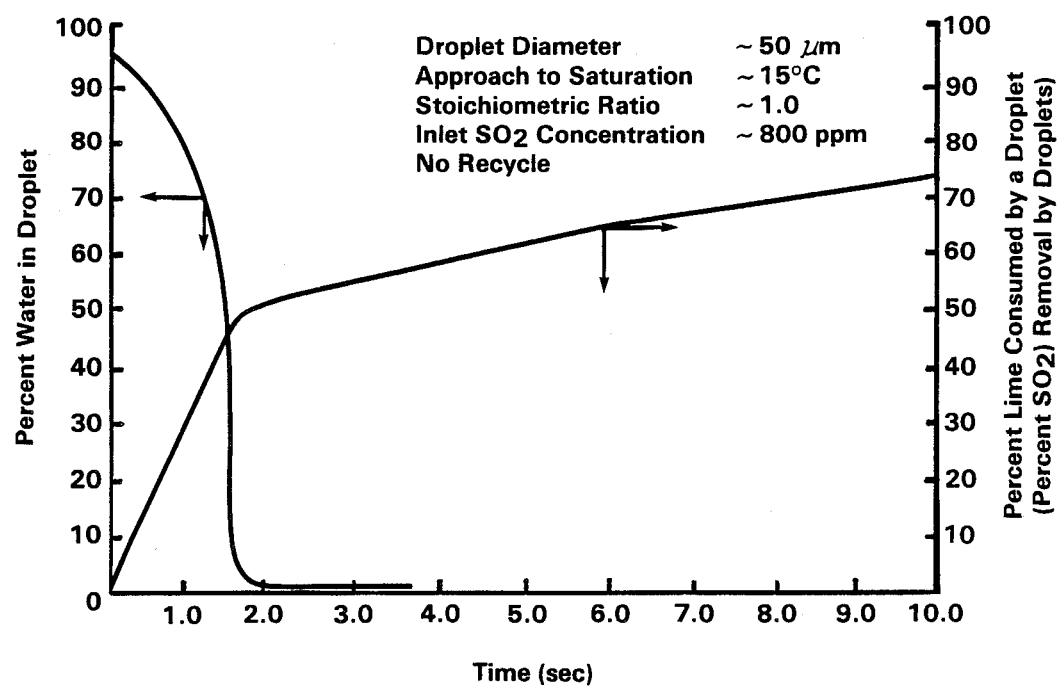
FIG. 14 is a graph showing evaporation of water and $SO_2$ absorption by a droplet in a spray dryer.

Table 1, below, demonstrates, in 1984 dollars, the economic advantages achieved by the present invention. FIG. 6 graphically illustrates the cost effectiveness of the present invention at various stoichiometric ratios.

TABLE 1

| | |
|---|---|
| Basis: | Retrofit to 500 MW |
| | Bituminous coal @ 3.5% sulfur |
| | Lime slurry E-SOX at Ca/S of 1.3 and 1.8 |

TABLE 1-continued 20 years remaining boiler life
All costs presented in 1984 $
Conservative assumptions

| | | |
|---|---|---|
| Stoichiometry | 1.3 | 1.8 |
| Recycle | Yes | No |
| Capital investment, $/kW | 75 | 80 |
| Annual operating expense, mills/kWh | 4.2 | 5.0 |
| Fixed capital carrying, mills/kWh (@ fixed charge rate of 0.16) | 2.2 | 2.3 |
| First year annualized revenue requirement, mills/kWh | 6.4 | 7.3 |

It is to be understood that the present invention is not limited to the embodiments disclosed which are illustratively offered and that modifications may be made without departing from the invention.

What is claimed is:

1. A method of retrofitting an apparatus for removing acidic gas and particulate matter from air, the device to be retrofit including an electrostatic precipitator, lacking a precharger, positioned within a housing, a flue gas generating means outside said housing, an entry port in said housing and upstream of said electrostatic precipitator; an exit port in said housing and downstream of said electrostatic precipitator; and ductwork, outside said housing, leading from said generating means to said entry port; said retrofitting comprising the steps of:

substituting electrostatic filtration units, for dry electrostatic precipitation, each comprising a precharger and a downstream particle collector having wires of from ¼ to ½ inch in diameter for said electrostatic precipitator, said substituted units being designed so as to occupy less space in the housing that said electrostatic filter lacking a precharger, thereby leaving free space within said housing between a one of said prechargers which is first downstream from said entry port and said exit port;

inserting an acidic gas removal means, within said housing, essentially entirely within said free space between said entry port and said one of said prechargers, said acidic gas removing means having a means for spraying an acidic gas neutralizing agent, in water droplets having a diameter of from 5 to 60 micrometers, into said flue gas drying means for maintaining said wires in an essentially dry state, said drying means including a reaction zone of sufficient length for said neutralizing agent in water and the acidic gases to react and form a wet neutral salts and for said water to evaporate from said wet neutral salts to form dry neutral salts, for removal by said electrostatic filtration units.

2. The method of claim 1, wherein said reaction zone is formed to have a size so that, at operational gas flow, the residence time for a droplet is $t=0.0097706+0.0002579d^2$, wherein t is in seconds and d is the average droplet diameter in micrometers which said varying means is adapted to spray.

3. The method of claim 1, wherein the diameter of droplet said spraying means is adapted to spray is from 5 to 20 micrometers.

4. The method of claim 2, wherein the diameter of droplet which said spraying means is adapted to spray is from 5 to 20 micrometers.

* * * * *